US012110984B1

(12) United States Patent
Lin

(10) Patent No.: US 12,110,984 B1
(45) Date of Patent: Oct. 8, 2024

(54) GATE VALVE CAPABLE OF ENHANCING ACCURACY IN OPERATION

(71) Applicant: KING LAI HYGIENIC MATERIALS CO., LTD, Zhubei (TW)

(72) Inventor: Cheng-Chimr Lin, Zhubei (TW)

(73) Assignee: KING LAI HYGIENIC MATERIALS CO., LTD, Zhubei (TW)

( * ) Notice: Subject to any disclaimer, the term of this patent is extended or adjusted under 35 U.S.C. 154(b) by 28 days.

(21) Appl. No.: 18/312,702

(22) Filed: May 5, 2023

(30) Foreign Application Priority Data

Mar. 16, 2023 (TW) ................................ 112109847

(51) Int. Cl.
*F16K 31/122* (2006.01)
*F16K 3/02* (2006.01)
*F16K 3/18* (2006.01)

(52) U.S. Cl.
CPC ........ *F16K 31/1225* (2013.01); *F16K 3/0254* (2013.01); *F16K 3/188* (2013.01); *F16K 3/0281* (2013.01)

(58) Field of Classification Search
CPC . F16K 3/0254; F16K 3/10; F16K 3/18; F16K 3/188; F16K 31/1225; F16K 51/02
See application file for complete search history.

(56) References Cited

U.S. PATENT DOCUMENTS

| | | | |
|---|---|---|---|
| 2006/0124886 A1* | 6/2006 | Brenes | F16K 3/188 251/326 |
| 2014/0131603 A1* | 5/2014 | Blecha | F16K 3/188 251/158 |
| 2015/0014556 A1* | 1/2015 | Ishigaki | F16K 3/184 251/12 |
| 2017/0204647 A1* | 7/2017 | Ehrne | F16K 51/02 |
| 2018/0051825 A1* | 2/2018 | Ehrne | F16K 51/02 |
| 2018/0274695 A1* | 9/2018 | Ehrne | F16K 51/02 |
| 2020/0208755 A1* | 7/2020 | Shimoda | F16K 31/122 |

* cited by examiner

*Primary Examiner* — Reinaldo Sanchez-Medina
(74) *Attorney, Agent, or Firm* — MUNCY, GEISSLER, OLDS & LOWE, P.C.

(57) ABSTRACT

A gate valve includes a valve base, a first piston unit disposed in the valve base and driven by a fluid to move the valve door between a first position where the valve port is opened and a second position where the valve port is covered, a second piston unit disposed in the valve base and driven by the fluid to move the valve door between the second position and a third position where the valve port is sealed, and a valve door fitted to a valve port of the valve base. At least one flow channel switch is disposed in the valve base. When the flow channel switch is turned on, the fluid is allowed to pass through, such that the second piston unit drives accurately the valve door to seal the valve port, thereby achieving purposes of enhancing accuracy in operation and ensuing airproof performance.

10 Claims, 23 Drawing Sheets

GATE VALVE CAPABLE OF ENHANCING ACCURACY IN OPERATION

BACKGROUND OF THE INVENTION

1. Field of the Invention

The present invention relates to gate valves and more particularly, to a gate valve capable of enhancing accuracy in operation.

2. Description of the Related Art

Simply speaking, a traditional vacuum valve mainly uses a fluid to drive a valve stem to move along two degrees of freedom, such that a valve plate is driven by the valve stem to move to a valve port along a direction parallel to the valve port, and then driven by the valve stem to move towards the valve port along a direction vertical to the valve port until the valve plate and the valve port are close together, thereby ensuring an airproof effect between the valve plate and the valve port.

However, the valve stem provided by the traditional vacuum valve is driven by the fluid on one hand, and on the other hand, the valve stem drives the valve plate to move simultaneously. Once the fluid pressure is not well controlled, the operation accuracy of the valve plate will be affected to cause a drawback that the valve plate cannot be sealed, resulting in lack of airproof performance. Therefore, the traditional vacuum valve still has room for improvement in structure.

SUMMARY OF THE INVENTION

It is a primary objective of the present invention to provide a gate valve, which enhances accuracy in operation to ensure airproof performance.

To attain the above objective, the gate valve of the present invention comprises a valve base, a first piston unit, a second piston unit, a valve door unit, and a flow channel switch. The valve base includes a valve port, a shaft hole, a receiving chamber, a first piston trough, and a second piston trough. The shaft hole has an axial direction vertical to an opening direction of the valve port. The receiving chamber is located between the valve port and the shaft hole. The first piston trough is arranged adjacent to the shaft hole, and the first piston trough has an axial direction parallel to the opening direction of the shaft hole. In addition, the valve base further includes a fluid gateway, a fluid inlet, a fluid outlet, a first flow channel communicating with the fluid gateway, a second flow channel communicating with the first flow channel, a third flow channel communicating with the first flow channel, a fourth flow channel communicating with the third flow channel, a fifth flow channel communicating with the fourth flow channel and the fluid outlet, a sixth flow channel communicating with the fluid inlet, and a seventh flow channel communicating with the sixth flow channel, wherein each of the first flow channel, the second flow channel, the third flow channel, the fourth flow channel, the fifth flow channel, the sixth flow channel, and the seventh flow channel is configured for passage of a fluid. The first piston unit includes a first piston, a first piston shaft, and a transmission base. The first piston is movably disposed in the first piston trough of the valve base, and a first chamber communicating the second flow channel is formed by one end of the first piston and one end wall of the first piston trough, such that the first piston is driven by the fluid entering the first chamber to move towards the valve port along the axial direction of the first piston trough. A second chamber communicating with the seventh flow channel is formed by the outer surface of the first piston and the periphery wall of the first piston trough, such that the first piston is driven by the fluid entering the second chamber to move away from the valve port along the axial direction of the first piston trough. The first piston shaft is partially exposed outside the receiving chamber and has one end thereof connected with the first piston, such that the first piston shaft is driven by the first piston to move reciprocatedly along the axial direction of the first piston trough. The transmission base is disposed in the receiving chamber of the valve base in a way that the transmission base is movable along the axial direction of the first piston trough and connected with the first piston shaft in a way that the transmission base is movable along the axial direction of the second piston trough, such that the transmission base is driven by the first piston shaft to move reciprocatedly along the axial direction of the first piston trough. The second piston unit includes a second piston shaft and a second piston. The second piston shaft is inserted into the transmission base and allows the transmission base to move along the axial direction of the first piston trough. The second piston is movably disposed in the second piston trough of the valve base and connected with the second piston trough. A third chamber communicating with the fourth flow channel and a fourth chamber communicating with the sixth flow channel are respectively formed by two end surfaces of the second piston and two end walls of the second piston trough, such that the second piston is driven by the fluid entering the third chamber to push the transmission base through the second piston shaft away from the first piston shaft along the axial direction of the second piston trough, and the second piston is driven by the fluid entering the fourth chamber to pull the transmission base through the second piston shaft towards the first piston shaft along the axial direction of the second piston trough. The valve door unit includes a pivot base, a driving shaft, and a valve door. The pivot base is movably disposed in the shaft hole of the valve base. The driving shaft is fixed to the transmission base and has one end thereof penetrating into the shaft hole of the valve base and pivoted to the pivot base, such that the driving shaft is moved synchronously with the transmission base. The valve door is connected with the driving shaft, such that the valve door is moved through the axial movement of the driving shaft between a first position where the valve port is opened and a second position where the valve port is covered, and the valve door is moved through the pivot movement of the driving shaft between the second position and a third position where the valve port is sealed. The flow channel switch is disposed in at least one of a junction of the third and fourth flow channels and a junction of the sixth and seventh flow channels. When the flow channel switch is turned on, the fluid is allowed to pass through.

It can be seen from the above that after the fluid enters the first chamber along the second flow channel, the first piston unit is driven by the fluid to move the valve door through the transmission base and the driving shaft from the first position to the second position, and then after the fluid flows along the third and fourth flow channels to the third chamber, the second piston unit is driven by the fluid to move the valve door through the transmission base and the driving shaft from the second position to the third position, such that the valve port is sealed by the valve door. At this time, the fluid in the fourth flow channel exits the valve base from the fluid outlet along the fifth flow channel. On the contrary, after the fluid enters the fourth chamber along the sixth flow channel, the second piston unit is driven by the fluid to move the valve door through the transmission base and the driving shaft from the third position to the second position, and then after the fluid flows along the seventh flow channel to the second chamber, the first piston unit is driven by the fluid to move the valve door through the transmission base and the driving shaft from the second position to the first position, such that the valve port is opened. At this time, the fluid in the first chamber exits the valve base from the fluid gateway along the second and first flow channels. During flow of the fluid, the flow channel switch is used for controlling whether the fluid can pass through. Before the fluid has fully arrived, the flow channel switch is turned off. Until the fluid has fully arrived, the flow channel switch is turned on to allow the fluid to pass through, such that the pressure provided by the fluid can reliably drive the first and second piston units. As such, the valve door can accurately close or open the valve port to achieve purposes of enhancing accuracy in operation and ensuring airproof performance.

Preferably, the flow channel switch can be only disposed in a junction of the third and fourth flow channels or a junction of the sixth and seventh flow channels according to actual needs, or the flow channel switches can be simultaneously disposed in the junction of the third and fourth flow channels and the junction of the sixth and seventh flow channels according to actual needs.

Preferably, under the situation that the flow channel switch is disposed in the junction of the third and fourth flow channels, the flow channel switch includes a switch base having a fluid input hole connected with the third flow channel and a fluid output hole connected with the fourth flow channel, a stem disposed in the switch base and driven by the first piston shaft to move from a close position to an open position, a sealing member sleeved on the stem, and an elastic member providing an elastic force to the stem. In this way, when the stem is located at the close position by the elastic force of the elastic member, the fluid entering the switch base through the fluid input hole is not allowed to reach the fluid output hole by obstruction of the sealing member, and when the stem is driven by the first piston shaft to move to the open position, the fluid entering the switch base through the fluid input hole is allowed to reach the fluid output hole.

Preferably, under the situation that the flow channel switch is disposed in the junction of the sixth and seventh flow channels, the flow channel switch includes a switch base having a fluid input hole connected with the sixth flow channel and a fluid output hole connected with the seventh flow channel, a stem disposed in the switch base and driven by the second piston shaft to move from a close position to an open position, a sealing member sleeved on the stem, and an elastic member providing an elastic force to the stem. In this way, when the stem is located at the close position by the elastic force of the elastic member, the fluid entering the switch base through the fluid input hole is not allowed to reach the fluid output hole by obstruction of the sealing member, and when the stem is driven by the second piston shaft to move to the open position, the fluid entering the switch base through the fluid input hole is allowed to reach the fluid output hole.

Preferably, another flow channel switch can be disposed in a junction of the fifth flow channel and the fluid outlet. The flow channel switch includes a stem disposed in a fluid output tank of the valve base and driven by the second piston shaft to move from a close position to an open position, a sealing member sleeved on the stem, and an elastic member providing an elastic member to the stem. In this way, when the stem is located at the close position by the elastic force of the elastic member, the fluid entering the fluid output tank through the fifth flow channel is not allowed to reach the fluid outlet by the obstruction of the sealing member, and when the stem is driven by the second piston shaft to move to the open position, the fluid entering the fluid output tank through the fifth flow channel is allowed to reach the fluid outlet.

Preferably, the valve base further includes a buffer channel connected between the first and second flow channels. A plug is disposed between the buffer channel and the first flow channel, and an elastic member provides an elastic force to push the plug towards the first flow channel. In this way, when the pressure exerted by the fluid on the plug is greater than the pressure exerted by the elastic member on the plug, the fluid is allowed to flow from the first flow channel to the second flow channel through the buffer channel, and then reach the first chamber from the second flow channel. On the contrary, when the fluid reaches the buffer channel from the first chamber through the second flow channel, the fluid flows slowly into the first flow channel along a gap between the plug and the buffer channel, and then exits the valve base from the first flow channel. In this way, the discharge pressure of the fluid is buffered to prevent the valve door from opening too fast.

Other advantages and features of the present invention will be fully understood by reference to the following specification in conjunction with the accompanying drawings, in which like reference signs denote like components of structure.

DETAILED DESCRIPTION OF THE INVENTION

Figure 1:
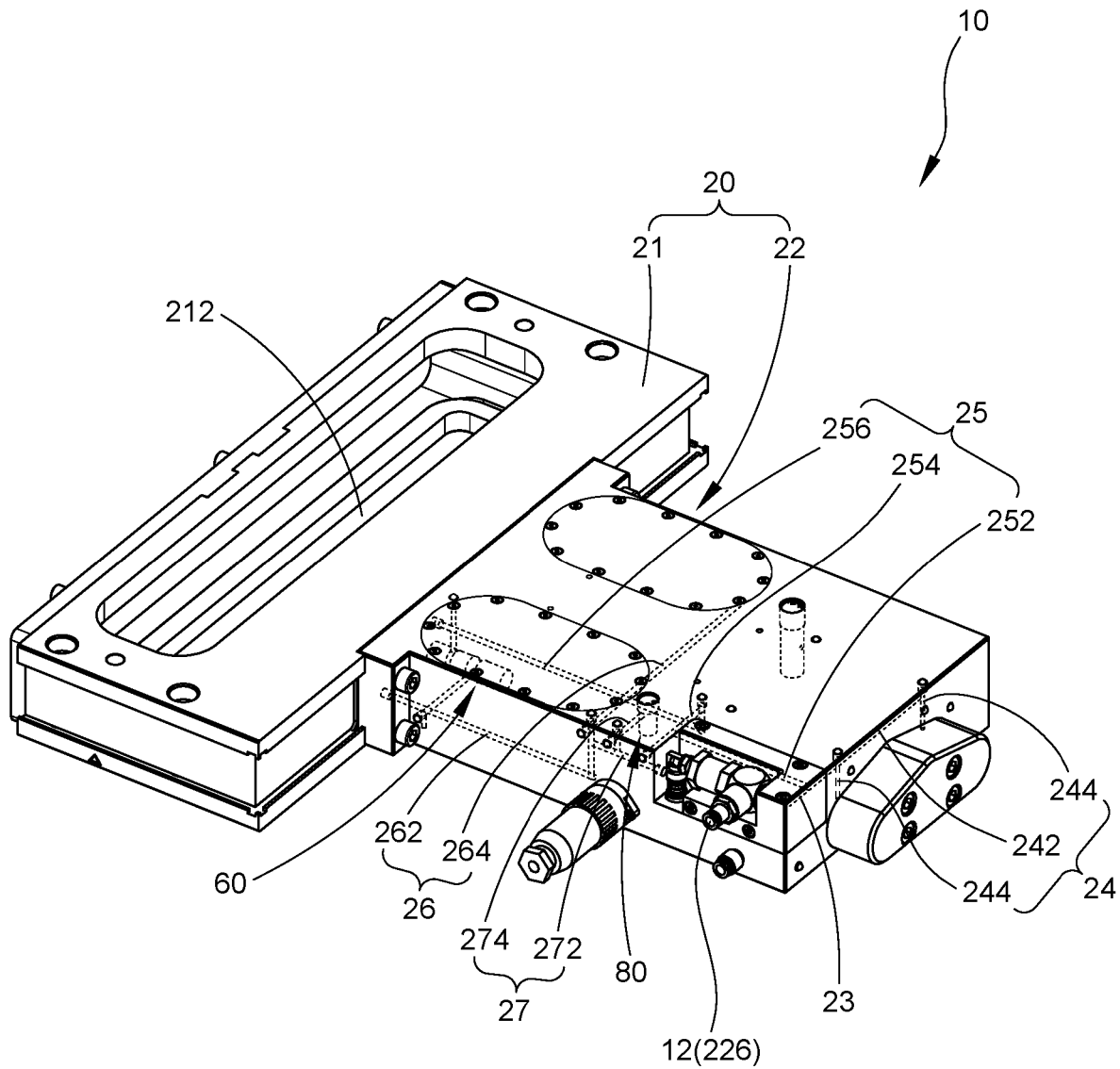
FIG. 1 is a perspective view of a gate valve of the present invention, showing that the positions of the first, second, third, fourth, and fifth flow channels.

First of all, it is to be mentioned that the directions used in the following embodiments and the appendix claims are based on the directions in the appendix drawings. Further, same or similar reference numerals used in the following embodiments and the appendix drawings designate same or similar elements or the structural features thereof.

Referring to FIGS. 1, 2, 4, 7 and 12, a gate valve 10 of the present invention comprises a valve base 20, two first piston units 30, two second piston units 40, a valve door unit 50, and three flow channel switches 60, 70, 80.

Figure 4:
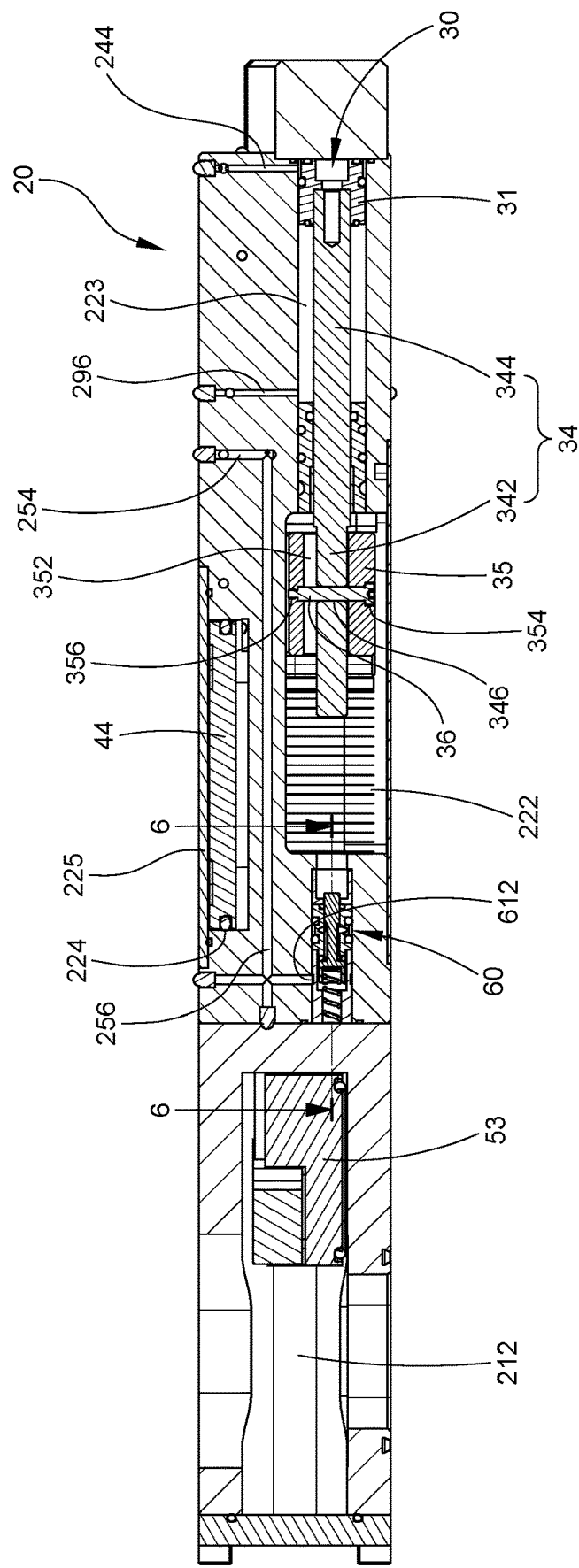
FIG. 4 is a sectional view taken along line 4-4 of FIG. 3, showing that the valve door is located at the first position.
Figure 5:
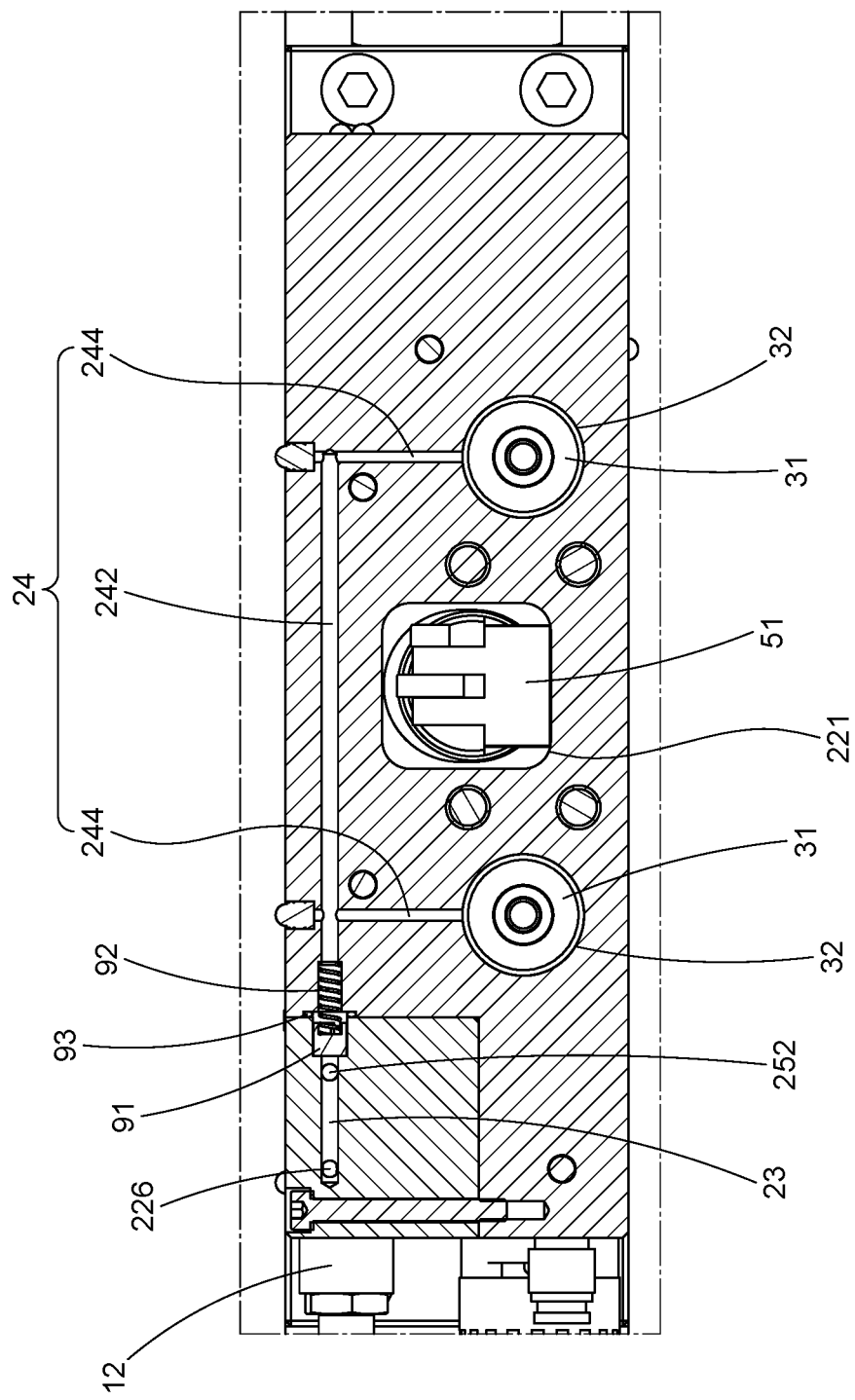
FIG. 5 is a sectional view taken along line 5-5 of FIG. 3, showing that the fluid enters the first chamber from the first flow channel through the second flow channel.
Figure 12:
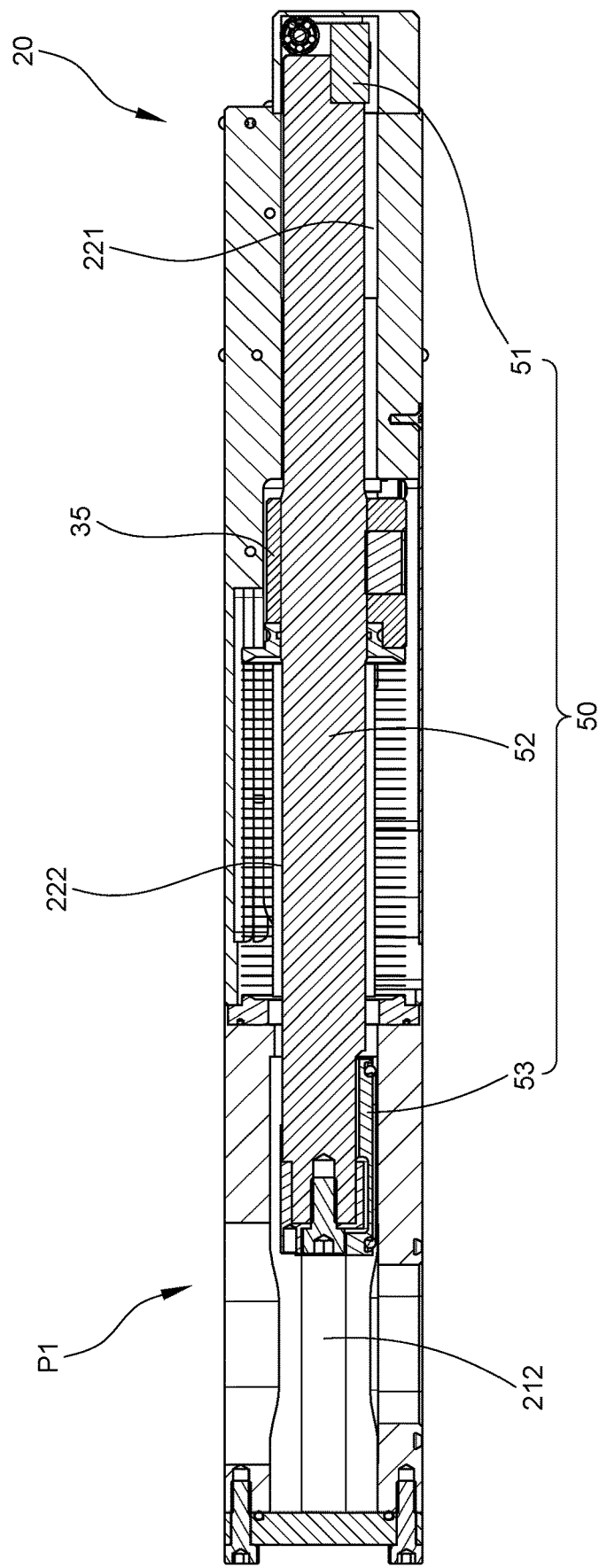
FIG. 12 is a sectional view taken along line 12-12 of FIG. 3, showing that the valve door is located at the first position.

The valve base 20 includes a rectangular first body 21 and a rectangular second body 22. One short side of the second body 22 is screwed to one long side of the first body 21, so that the valve base 20 has a T-shaped configuration. The first body 21 includes a valve port 212 through top and bottom sides thereof. The second body 22 has a shaft hole 221, a receiving chamber 222, two first piston troughs 223, and two second piston troughs 224 inside. The axial direction of the shaft hole 221 is vertical to the opening direction of the valve port 212 (as shown in FIG. 12). The receiving chamber 222 is located between the valve port 212 and the shaft hole 221, and communicates with the valve port 212 and the shaft hole 221 (as shown in FIG. 12). The first piston troughs 223 are arranged adjacent to the shaft hole 221, and the axial direction of each of the first piston trough 223 is vertical to the opening direction of the valve port 212 (as shown in FIGS. 4 and 5). The second piston troughs 224 are arranged adjacent to the receiving chamber 222 and covered by a lid 225, and the axial direction of each of the second piston trough 224 is parallel to the opening direction of the valve port 212 (as shown in FIG. 4).

Figure 2:
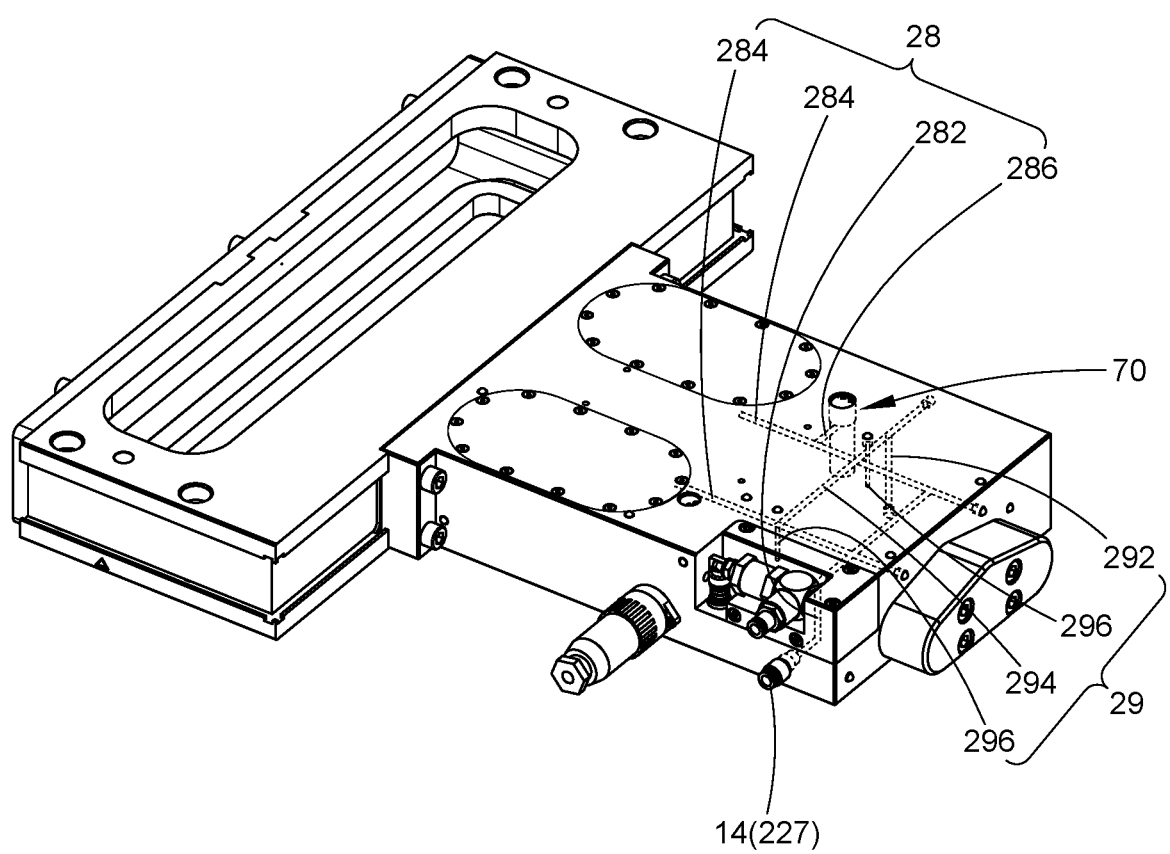
FIG. 2 is another perspective view of the gate valve of the present invention, showing that the positions of the sixth and seventh flow channels.
Figure 3:
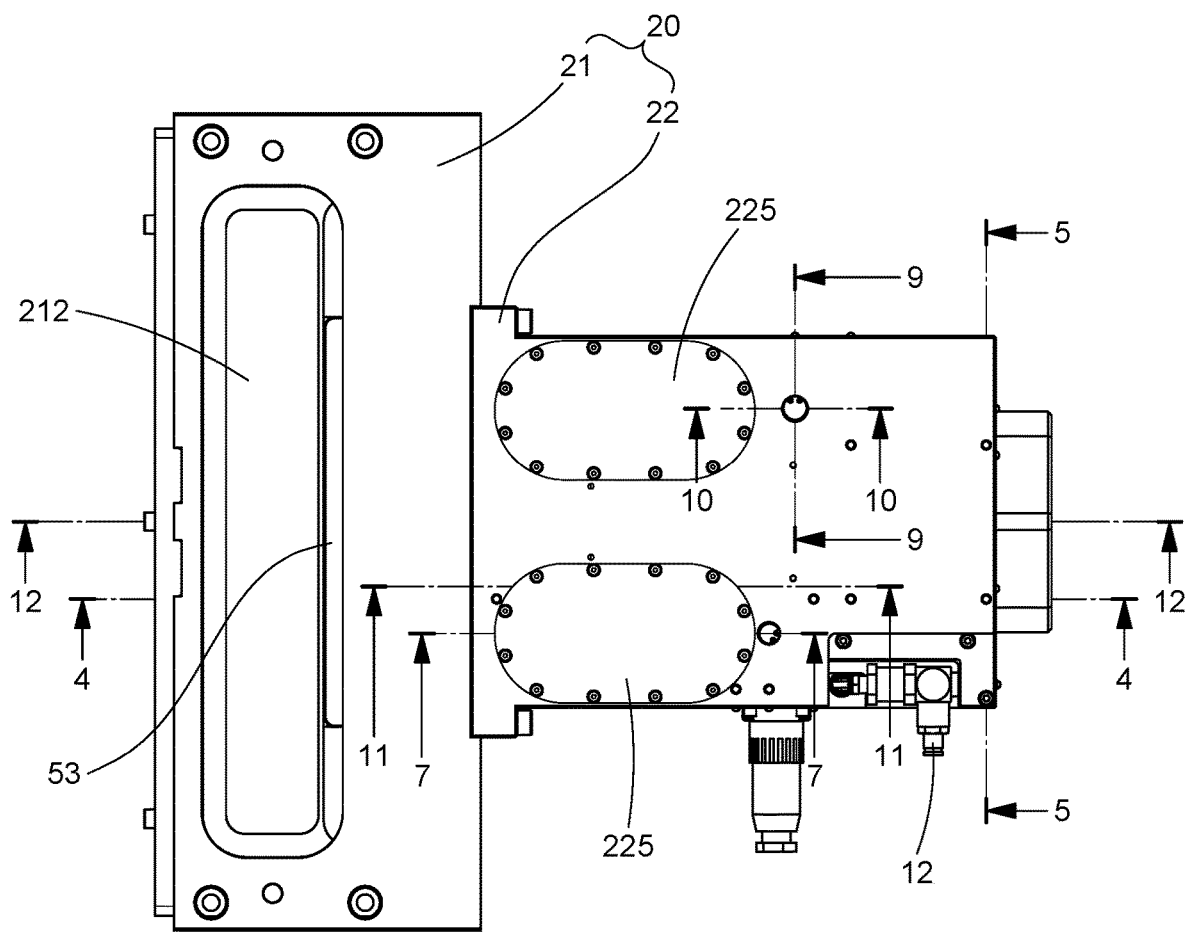
FIG. 3 is a plane view of the gate valve of the present invention.
Figure 6:
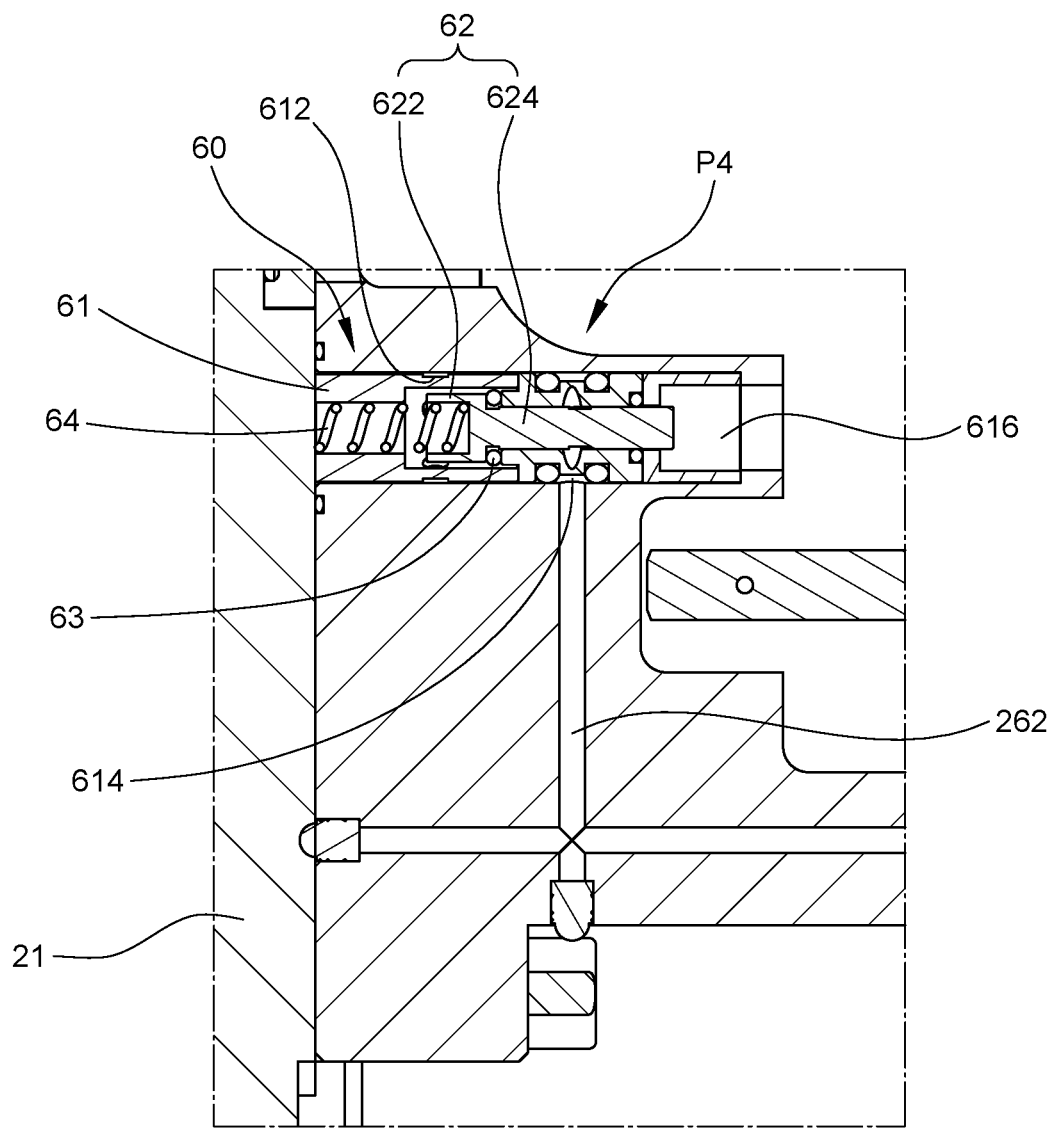
FIG. 6 is a sectional view taken along line 6-6 of FIG. 4, showing that the first flow channel switch is located at the close position.
Figure 7:
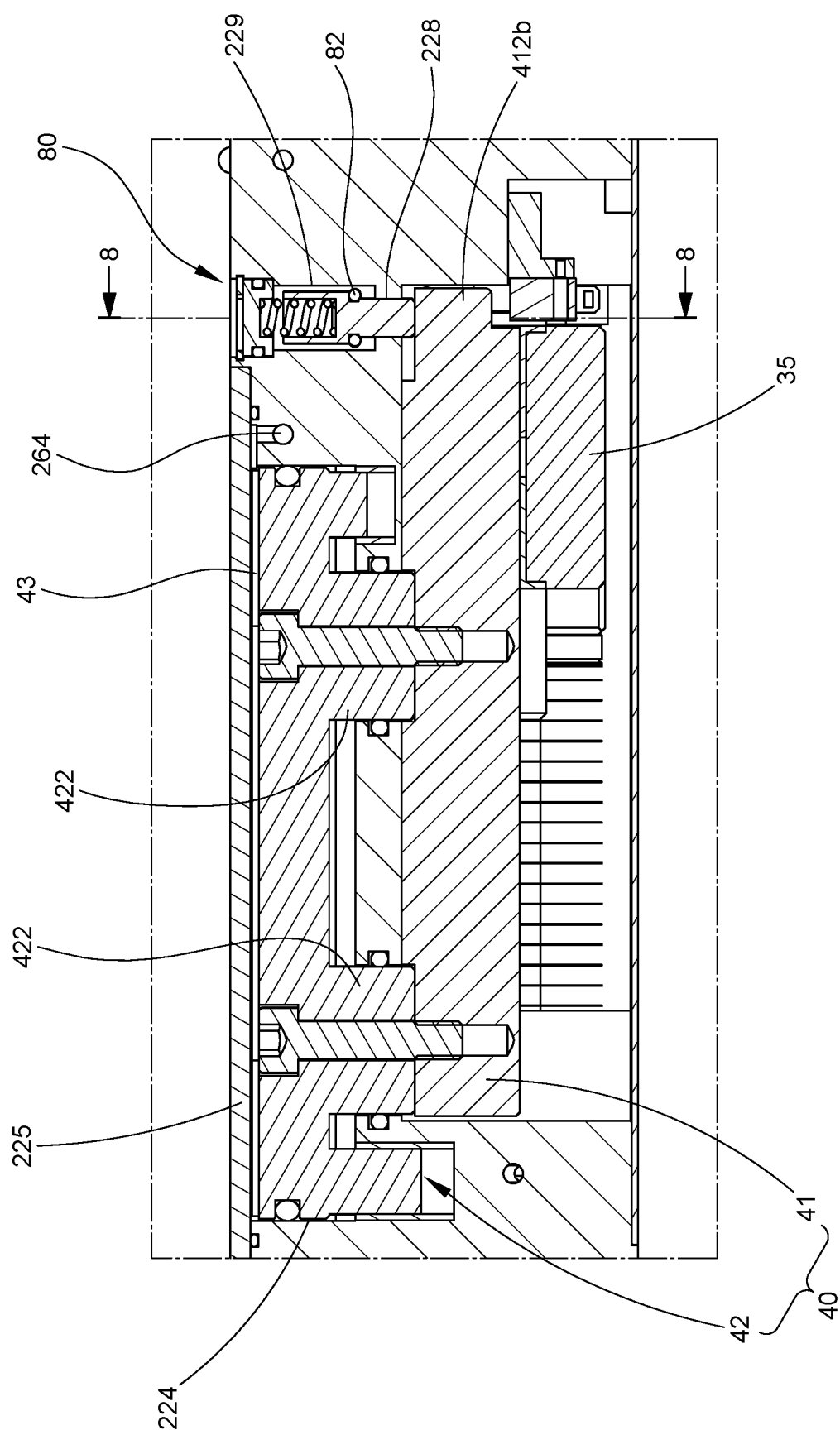
FIG. 7 is a sectional view taken along line 7-7 of FIG. 3, showing that the second flow channel switch is located at the open position.
Figure 18:
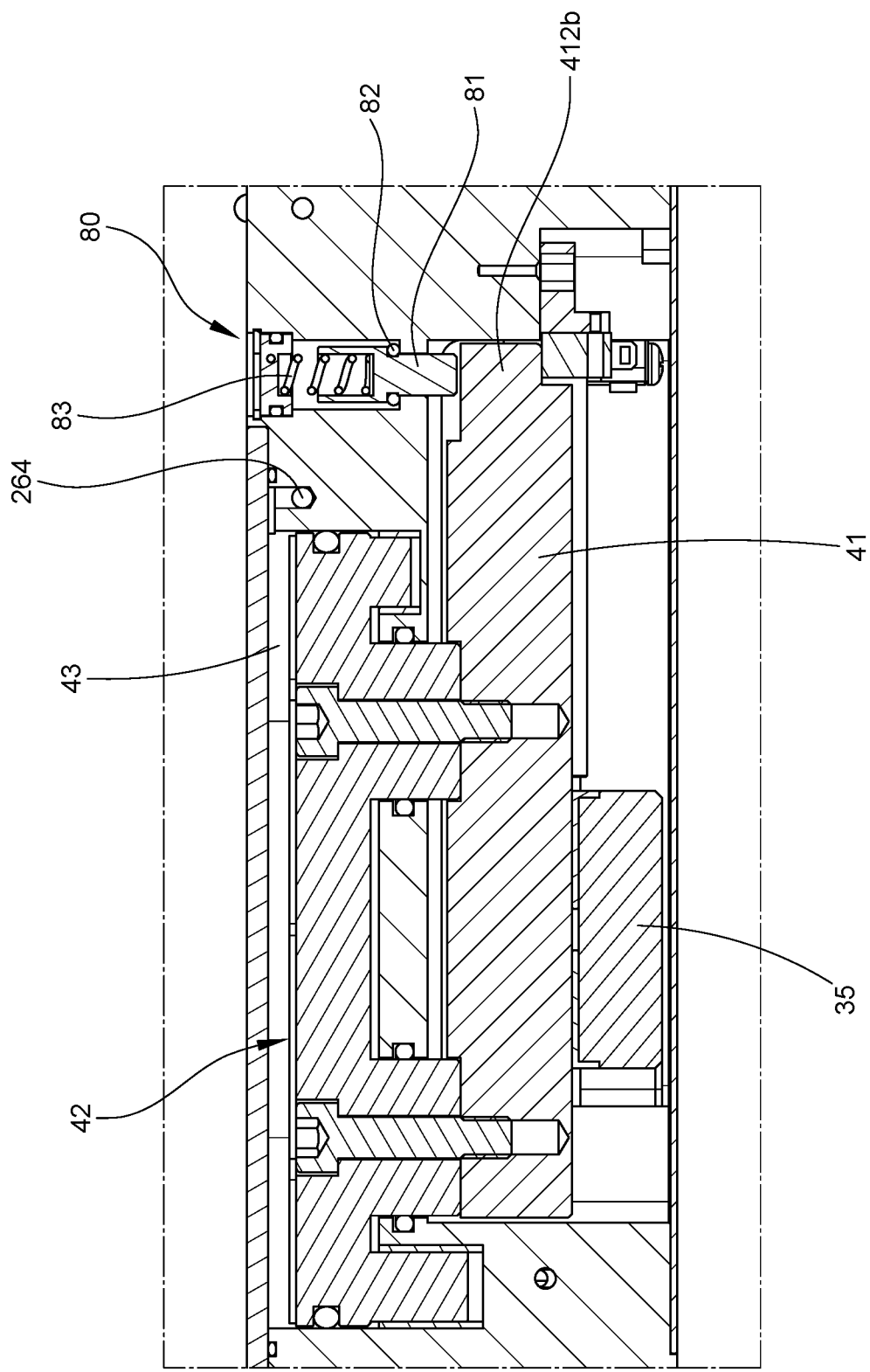
FIG. 18 is similar to FIG. 7, showing that the second flow channel switch is located at the close position.

As shown in FIGS. 1 and 2, one side of the second body 22 has a fluid gateway 226 and a fluid inlet 227 located under the fluid gateway 226. A first connector 12 is provided at the fluid gateway 226, and a second connector 14 is provided at the fluid inlet 227. As shown in FIG. 7, the second body 22 has a fluid outlet 228 at the bottom thereof and a fluid output tank 229 communicating with the fluid outlet 228. In addition, as shown in FIGS. 1 and 2, the second body 22 has a first flow channel 23, a second flow channel 24, a third flow channel 25, a fourth flow channel 26, a fifth flow channel 27, a sixth flow channel 28, and a seventh flow channel 29 inside. The first, second, third, fourth, fifth, sixth, and seventh flow channels 23, 24, 25, 26, 27, 28, 29 are configured for passage of a fluid (here, high-pressure air is taken as an example, but is not limited to the high-pressure air). One end of the first flow channel 23 is connected with the first connector 12 through the fluid gateway 226 (as shown in FIGS. 1 and 5). The second flow channel 24 has a first straight section 242 and two spaced second straight sections 244. As shown in FIGS. 1 and 5, the first straight section 242 extends along the width direction of the second body 22 and has one end thereof connected with the first flow channel 23. One end of each of the second straight sections 244 is vertically connected with the first straight section 242. The third flow channel 25 has a third straight section 252, a first turning section 254, and a second turning section 256. As shown in FIGS. 1 and 4, one end of the third straight section 252 is vertically connected with the first flow channel 23. One end of the first turning section 254 is vertically connected with the third straight section 252, and the other end of the first turning section 254 is vertically connected with the second turning section 256. The second turning section 256 extends towards the first body 21 along the longitudinal direction of the second body 22. The fourth flow channel 26 has a third turning section 262 and a fourth turning section 264. As shown in FIGS. 1, 6, and 7, the third turning section 262 extends away from the first body 21 along the longitudinal direction of the second body 22. The fourth turning section 264 extends along the width direction of the second body 22, and has one end thereof vertically connected with the third turning section 262. The fifth flow channel 27 has a fourth straight section 272 and a fifth turning section 274. As shown in FIGS. 1 and 18, one end of the fourth straight section 272 is connected with the fourth turning section 264 of the fourth flow channel 26. One end of the fifth turning section 274 is vertically connected with the fourth straight section 272, and the other end of the fifth turning section 274 communicates with the fluid output tank 229. The sixth flow channel 28 has a sixth turning section 282, two spaced fifth straight sections 284, and a sixth straight section 286. As shown in FIG. 2, one end of the sixth turning section 282 is connected with the second connector 14 through the fluid inlet 227. The fifth straight sections 284 extend along the longitudinal direction of the second body 22 and have one ends thereof vertically connected with the sixth turning section 282. One end of the sixth straight section 286 is vertically connected with one of the fifth straight sections 284. The seventh flow channel 29 has a seventh turning section 292, a seventh straight section 294, and two spaced eighth straight sections 296. As shown in FIG. 2, one end of the seventh turning section 292 is vertically connected with the seventh straight section 294. The seventh straight section 294 extends along the width direction of the second body 22. The eighth straight sections 296 have one ends thereof vertically connected with the seventh straight section 294.

Figure 8:
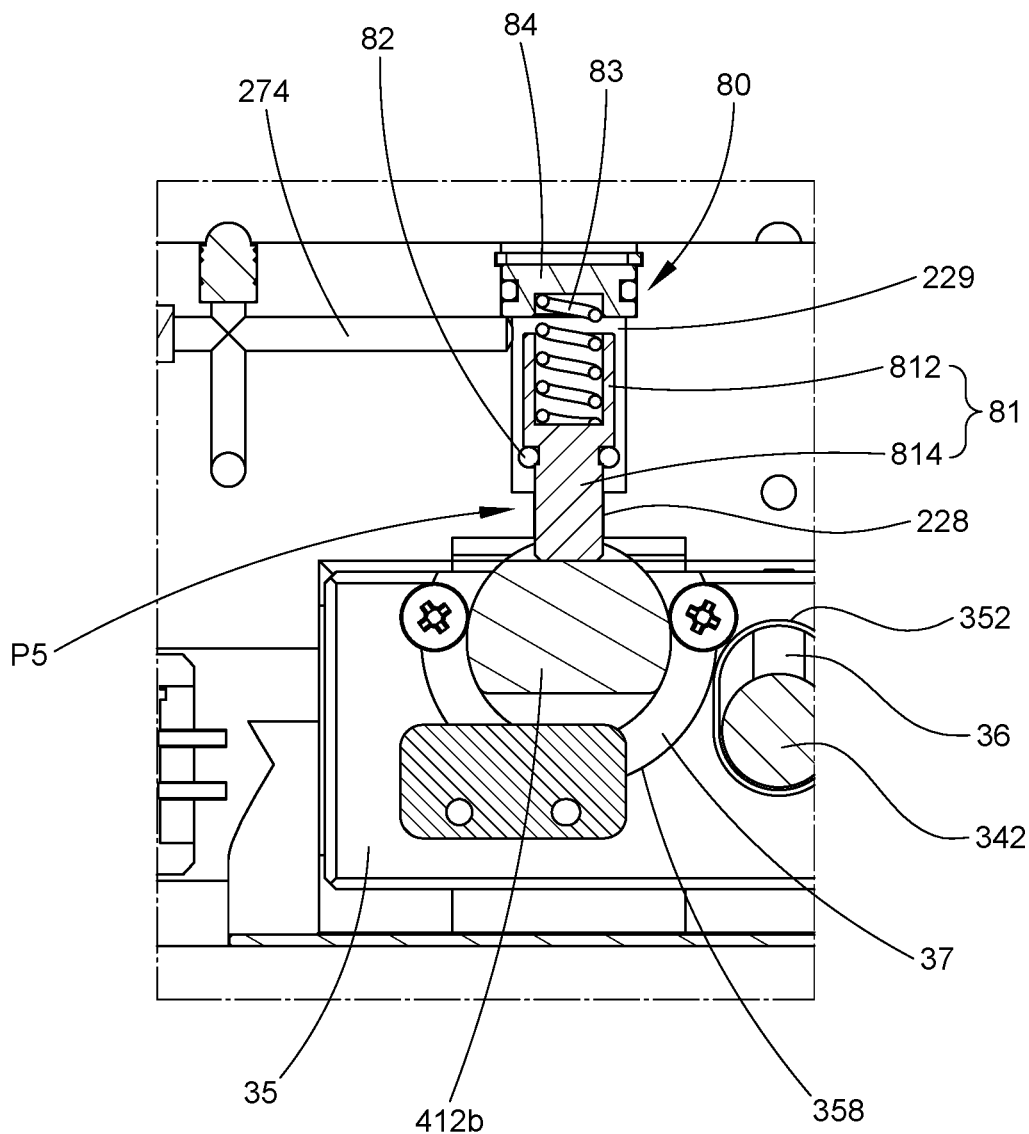
FIG. 8 is a sectional view taken along line 8-8 of FIG. 7, showing that the second flow channel switch is located at the open position.
Figure 13:
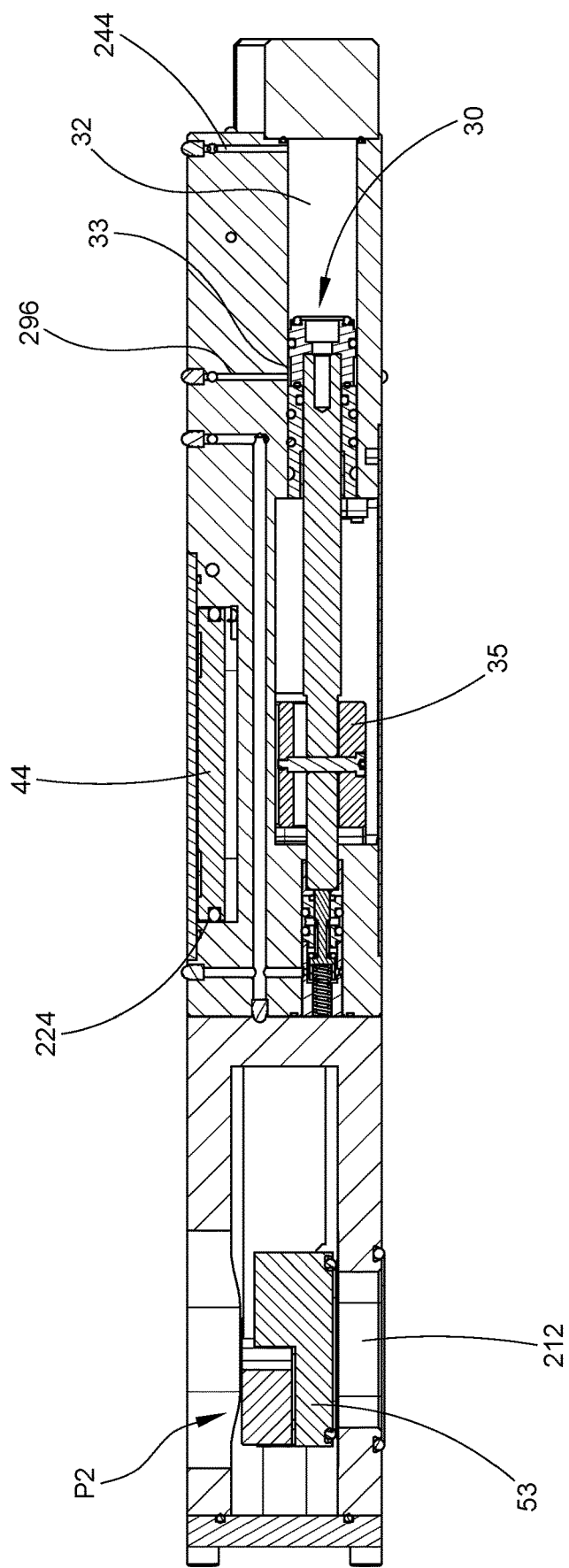
FIG. 13 is similar to FIG. 4, showing that the valve door is located at the second position.
Figure 14:
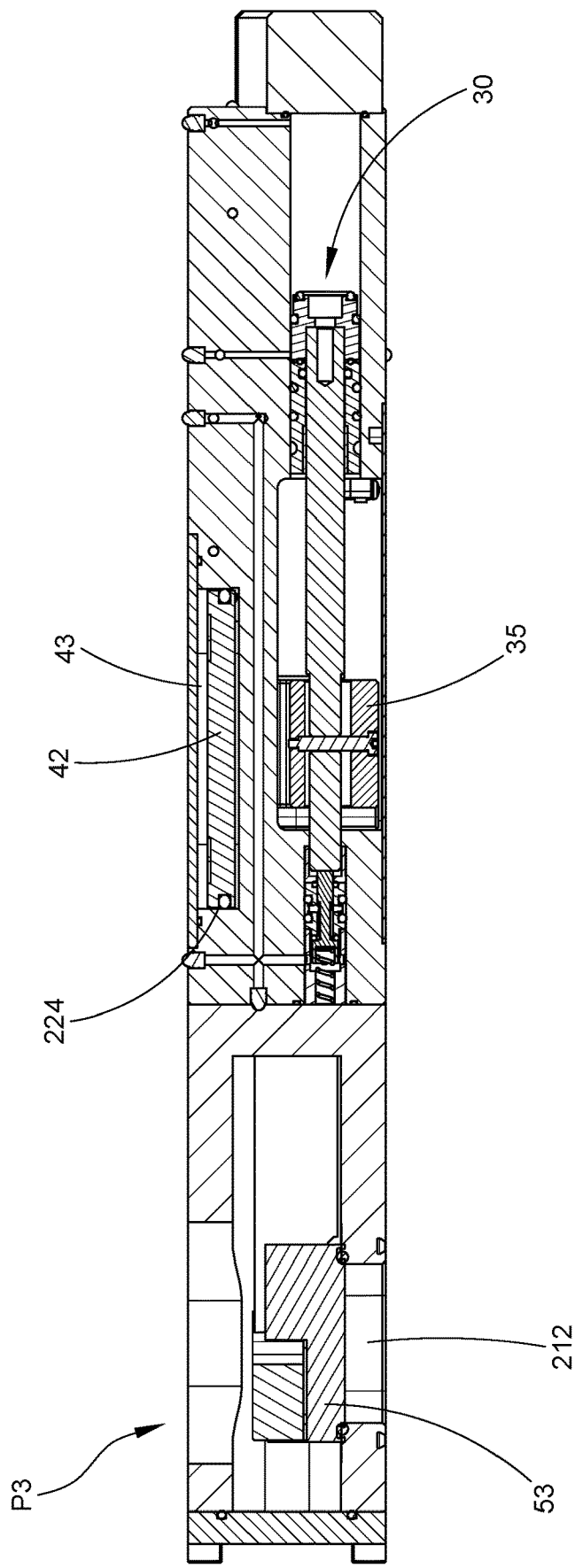
FIG. 14 is similar to FIG. 13, showing that the valve door is located at the third position.

The first piston units 30 each have a first piston 31, a first piston shaft 34, and a transmission base 35. As shown in FIG. 4, the first piston 31 is movably disposed in the first piston trough 223 of the valve base 20. A first chamber 32 (as shown in FIG. 13) is formed by one end of the first piston 31 and an end wall of the first piston trough 223. The first chamber 32 communicates with the second straight section 244 of the second flow channel 24 (as shown in FIGS. 5 and 13), such that the first piston 31 can be driven by the fluid entering the first chamber 32 to move towards the valve port 212 along the axial direction of the first piston trough 223 (as shown in FIG. 13). In addition, as shown in FIG. 13, a second chamber 33 is formed by the outer surface of the first piston 31 and the periphery wall of the first piston trough 223. The second chamber 33 communicates with the eighth straight section 296 of the seventh flow channel 29 (as shown in FIG. 13), such that the first piston 31 can be driven by the fluid entering the second chamber 33 to move away from the valve port 212 along the axial direction of the first piston trough 223 (as shown in FIG. 4). The first piston shaft 34 has a small diameter portion 342 and a large diameter portion 344. As shown in FIG. 4, the small diameter portion 342 is received in the receiving chamber 222 of the valve base 20 and provided with a radial through hole 346. One end of the large diameter portion 344 is penetrated into the first piston trough 223 and connected with the first piston 31, and the other end of the large diameter portion 344 is exposed outside the receiving chamber 222 of the valve base 20 and connected with the small diameter portion 342, such that the first piston shaft 34 can be driven by the first piston 31 to move reciprocatedly along the axial direction of the first piston trough 223. The transmission base 35 is disposed in the receiving chamber 222 of the valve base 20 and has a straight hole 352 sleeved on the small diameter portion 342 of the first piston shaft 34 (as shown in FIGS. 4 and 8). The transmission base 35 further has a counterbore hole 354 communicating with the straight hole 352 and a threaded hole 356 communicating with the counterbore hole 354. As shown in FIG. 4, a bolt 36 is penetrated through the counterbore hole 354 and the radial through hole 346 from bottom to up and threaded with the threaded hole 356, such that the transmission base 35 can be moved reciprocatedly along the axial direction of the first piston trough 223 (as shown in FIGS. 4 and 13), and moved reciprocatedly relative to the first piston unit 30 along the axial direction of the second piston trough 224 (as shown in FIGS. 13 and 14). In addition, as shown in FIG. 8, each of two ends of the transmission base 35 has a curved groove 358 and a curved pad 37 fitted in the curved groove 358.

Figure 9:
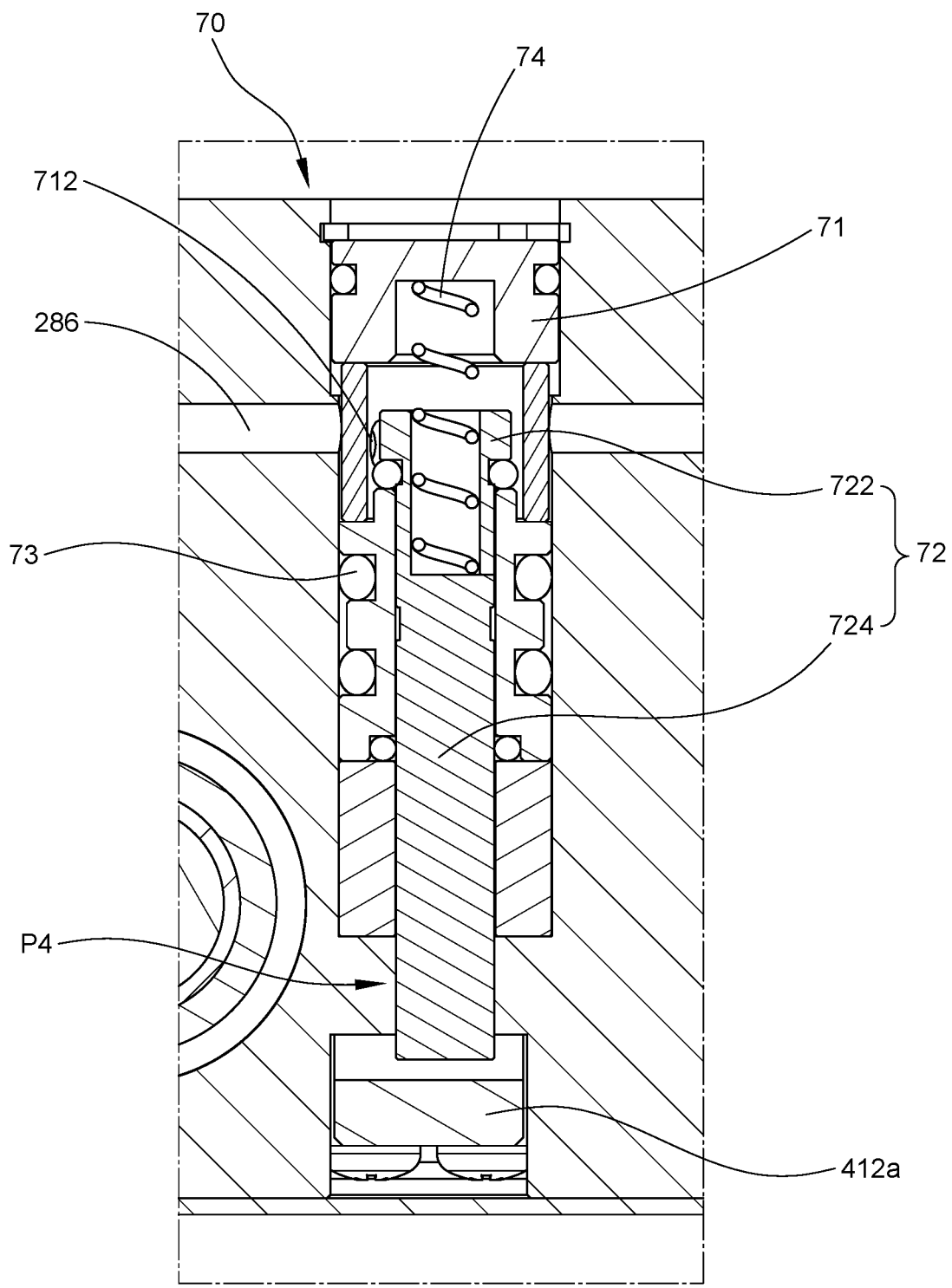
FIG. 9 is a sectional view taken along line 9-9 of FIG. 3, showing that the second flow channel switch is located at the close position.
Figure 11:
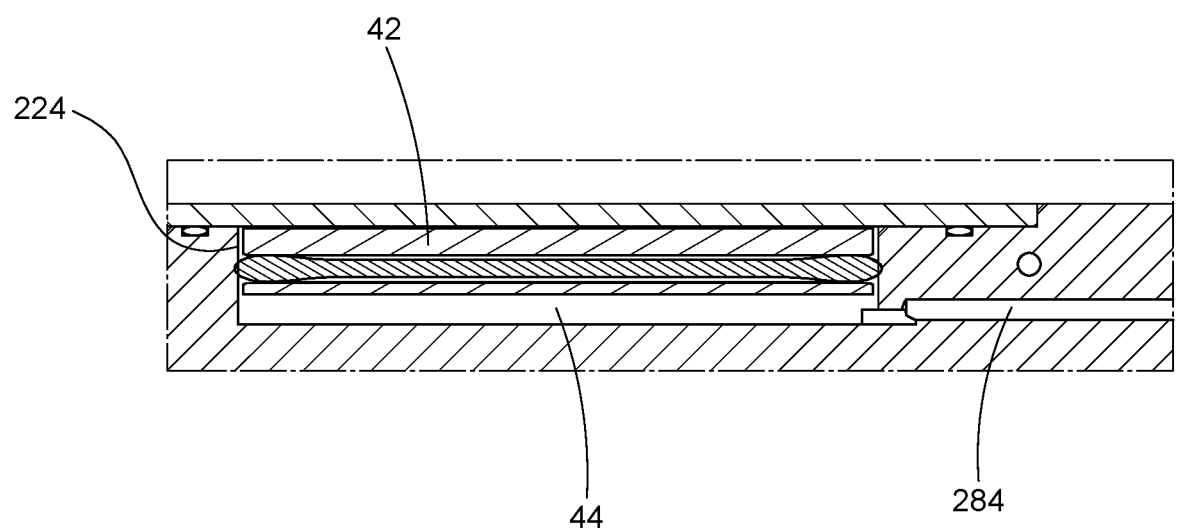
FIG. 11 is a sectional view taken along line 11-11 of FIG. 3.
Figure 20:
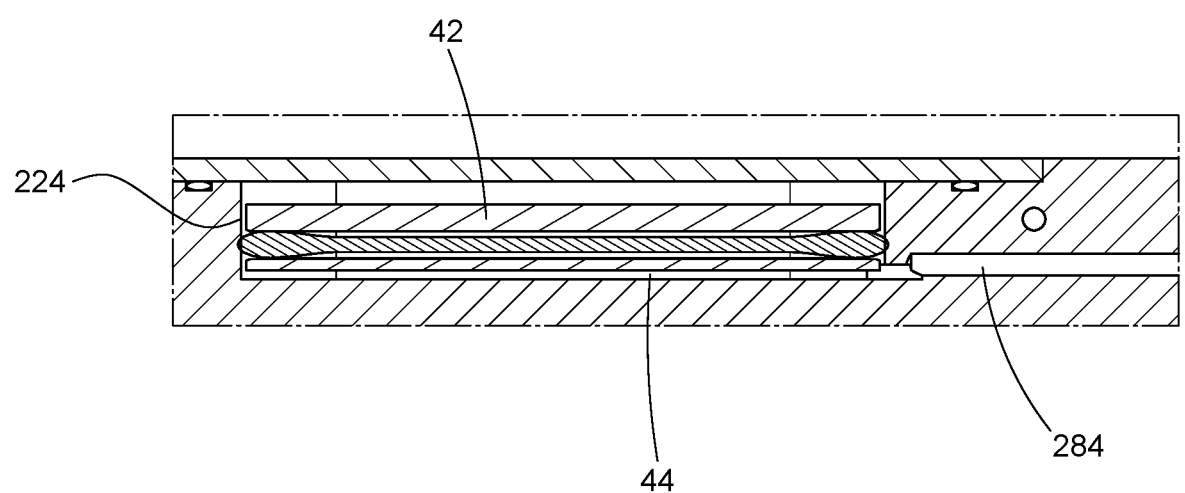
FIG. 20 is similar to FIG. 11, showing that the second piston is pushed upwards.

The second piston unit 40 includes a second piston shaft 41 and a second piston 42. The second piston shaft 41 is inserted into the transmission base 35 through the curved pad 37 (as shown in FIG. 8), such that the second piston shaft 41 allows the transmission base 35 to move along the axial direction of the first piston trough 223 on one hand, and on the other hand, the second piston shaft 41 can be moved reciprocatedly together with the transmission base 35 along the axial direction of the second piston trough 224. In addition, as shown in FIGS. 8 and 9, one of the second piston shafts 41 has a push portion 412a at the distal end thereof, and the other of the second piston shafts 41 has a push portion 412b at the distal end thereof. As shown in FIG. 7, the second piston 42 is movably disposed in the second piston trough 224 of the valve base 20 and has two protrusions 422 passing through the second piston trough 224 and screwed to the second piston shaft 41, such that the second piston 42 can be moved synchronously with the second piston shaft 41. Further, a third chamber 43 is formed between the top surface of the second piston 42 and the lid 225. The third chamber 43 communicates with the fourth turning section 264 of the fourth flow channel 26, such that the second piston 42 can be driven by the fluid entering the third chamber 43 to push the transmission base 35 downwards through the second piston shaft 41 along the axial direction of the second piston trough 224 (as shown in FIGS. 11 and 20). A fourth chamber 44 is formed between the bottom side of the second piston 42 and the bottom wall of the second piston trough 224. The fourth chamber 44 communicates with the fifth straight section 284 of the sixth flow channel 28, such that the second piston 42 can be driven by the fluid entering the fourth chamber 44 to push the transmission base 35 upwards through the second piston shaft 41 along the axial direction of the second piston trough 224 (as shown in FIGS. 11 and 20).

Figure 16:
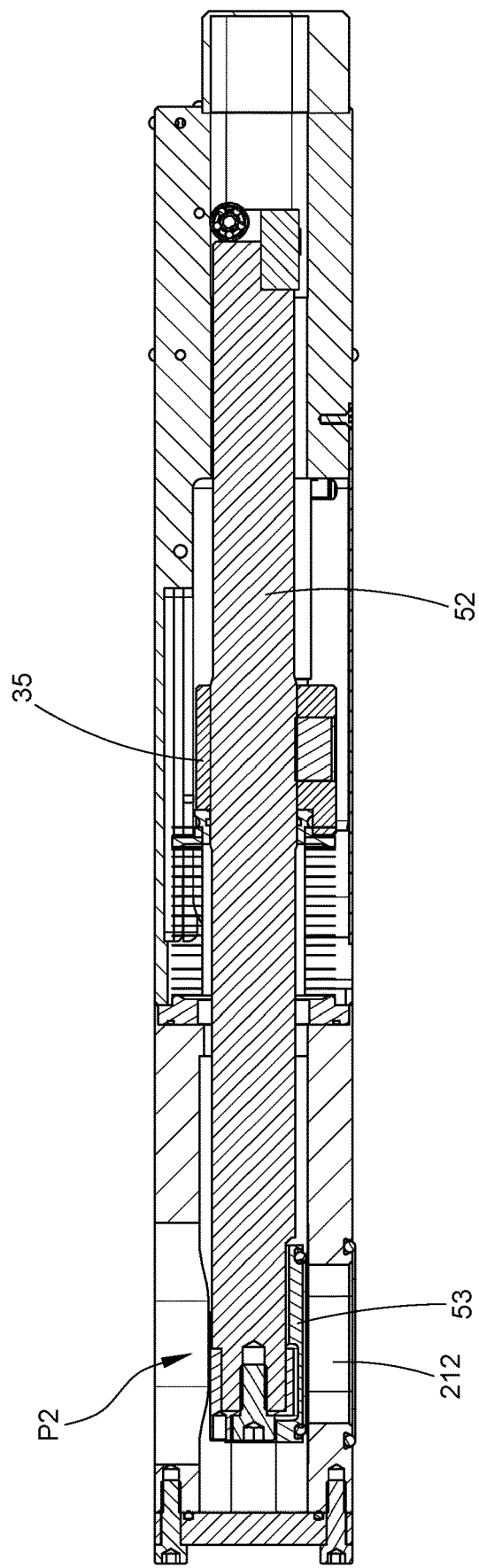
FIG. 16 is similar to FIG. 12, showing that the valve door is located at the second position.
Figure 17:
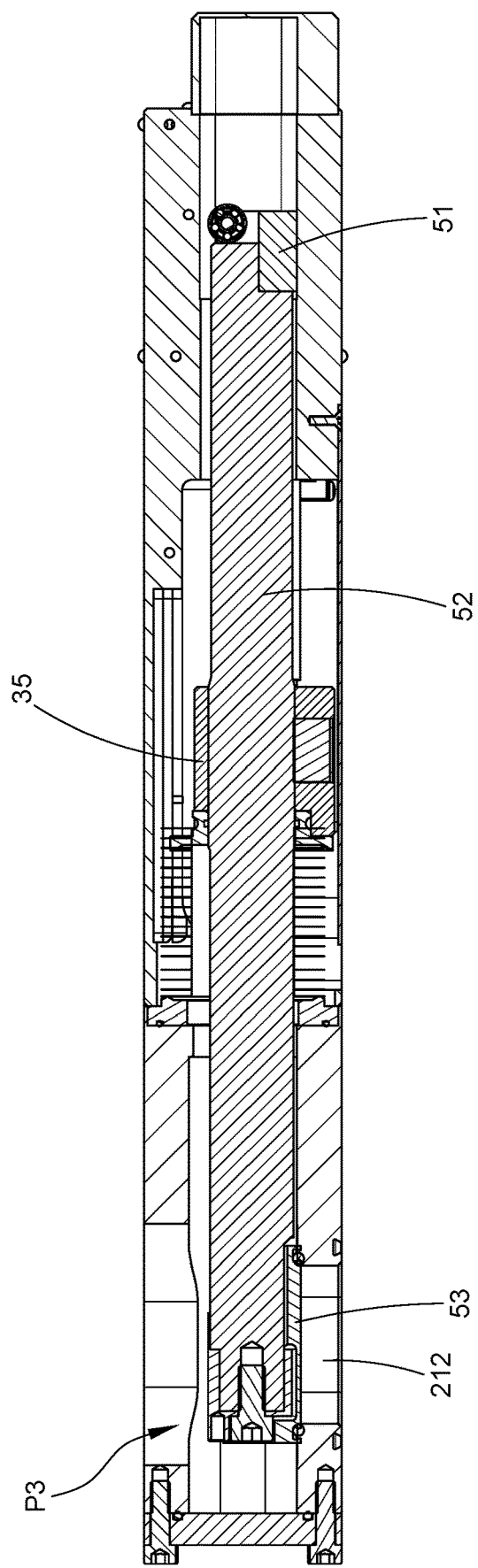
FIG. 17 is similar to FIG. 16, showing that the valve door is located at the third position.

The valve door unit 50 includes a pivot base 51, a driving shaft 52, and a valve door 53. As shown in FIG. 12, the pivot base 51 is movably disposed in the shaft hole 221 of the valve base 20. The driving shaft 52 is fixed to the transmission base 35 and has one end thereof penetrating into the shaft hole 221 of the valve base 20 and pivoted to the pivot base 51, such that the driving shaft 52 is moved synchronously with the transmission base 35 along the axial direction of the first piston trough 223 and pivoted by the actuation of the transmission base 35. The valve door 53 is connected with the driving shaft 52, such that the valve door 53 can be moved through the axial movement of the driving shaft 52 between a first position P1 where the valve port 212 is opened (as shown in FIG. 12), and a second position P2 where the valve port 212 is covered (as shown in FIG. 16), and the valve door 53 can be moved through the pivot movement of the driving shaft 52 between the second position P2 and a third position P3 where the valve port 212 is sealed (as shown in FIG. 17).

The flow channel switches 60, 70, 80 can be disposed in at least one of a junction of the third and fourth flow channels 25, 26, a junction of the sixth and seventh flow channels 28, 29, and a junction of the fifth flow channel 27 and the fluid outlet 228 according to actual needs. In this embodiment, the flow channel switches 60, 70, 80 are disposed in the junction of the third and fourth flow channels 25, 26, the junction of the sixth and seventh flow channels 28, 29, and the junction of the fifth flow channel 27 and the fluid outlet 228, i.e., The flow channel switches 60, 70, 80 are three in number and they are a first flow channel switch 60, a second flow channel switch 70, and a third flow channel switch 80.

Figure 15:
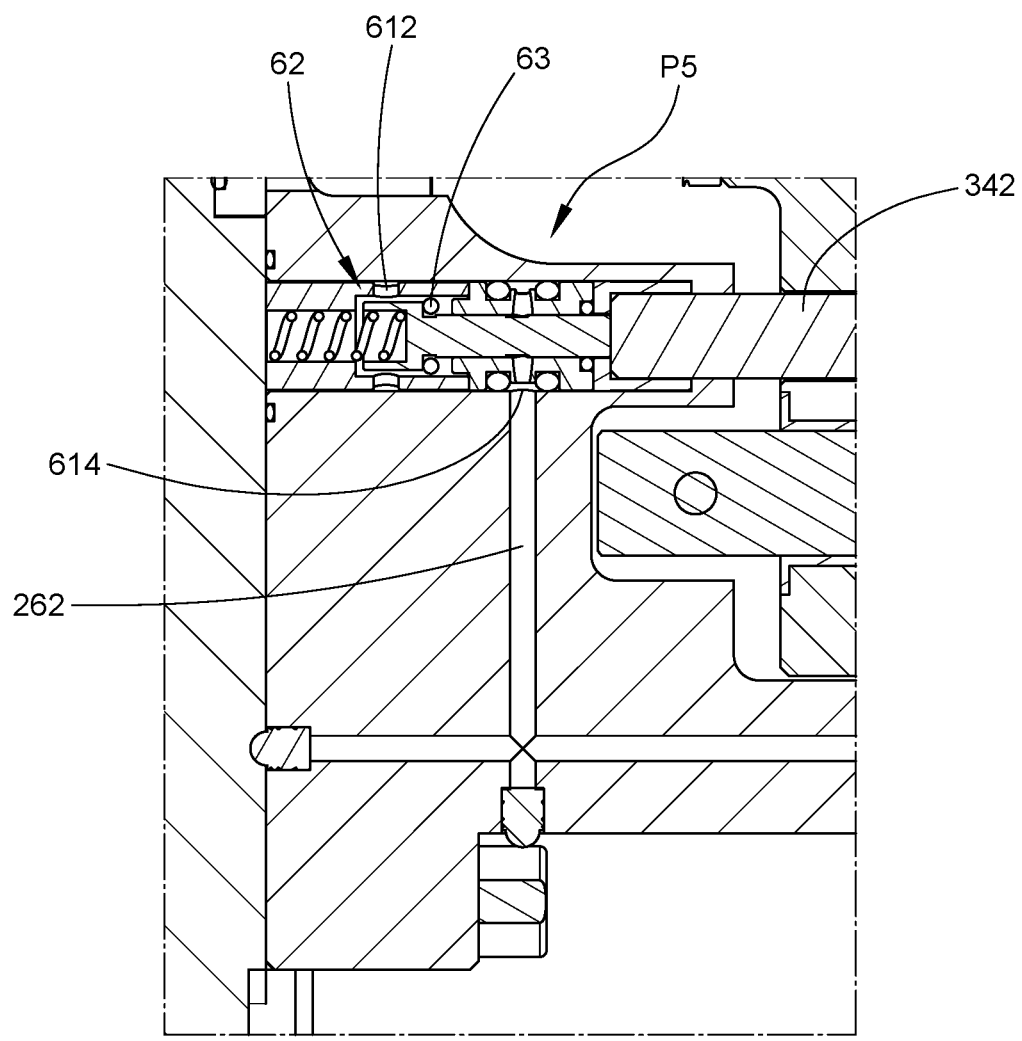
FIG. 15 is similar to FIG. 6, showing that the first flow channel switch is located at the open position.

As shown in FIG. 1, the first flow channel switch 60 is disposed in the junction of the third and fourth flow channels 25, 26. As shown in FIG. 6, the first flow channel switch 60 includes a switch base 61, a stem 62, a sealing member 63, and an elastic member 64. The switch base 61 has a fluid input hole 612 connected with the second turning section 256 of the third flow channel 25 (as shown in FIG. 4), and a fluid output hole 614 connected with the third turning section 262 of the fourth flow channel 26 (as shown in FIG. 6). Further, one end of the switch base 61 has an end hole 616 communicating with the receiving chamber 222. The stem 62 is disposed in the switch base 61 and has a head portion 622 and a body portion 624 connected with the head portion 622. The distal end of the body portion 624 is penetrated in the end hole 616 to be pushed by the small diameter portion 342 of the first piston shaft 34 (as shown in FIG. 15). The sealing member 63 is sleeved on the body portion 624 of the stem 62 and located between the fluid input hole 612 and the fluid output hole 614. The elastic member 64 has one end thereof abutted against the first body 21 and the other end thereof abutted against the head portion 622 of the stem 62 for providing an elastic force to the stem 62. In this way, when the stem 62 is located at a close position P4 by the elastic force of the elastic member 64, as shown in FIG. 6, the fluid entering the switch base 61 through the fluid input hole 612 is not allowed to reach the fluid output hole 614 by obstruction of the sealing member 63, and when the stem 62 is pushed by the small diameter portion 342 of the first piston shaft 34 to an open position P5, as shown in FIG. 15, the fluid entering the switch base 61 through the fluid input hole 612 is allowed to reach the fluid output hole 614 without obstruction of the sealing member 63.

Figure 10:
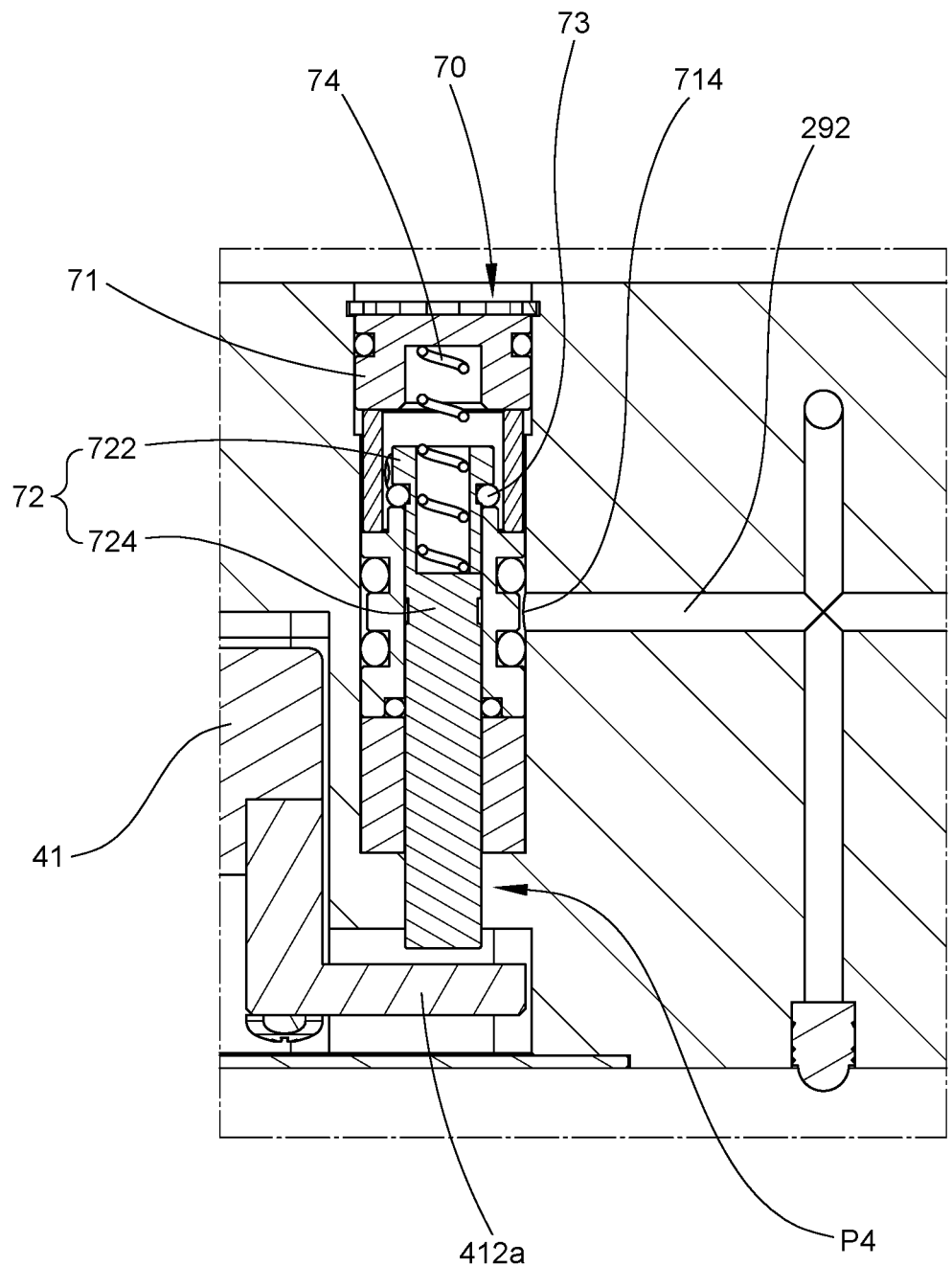
FIG. 10 is a sectional view taken along line 10-10 of FIG. 3, showing that the second flow channel switch is located at the close position.
Figure 21:
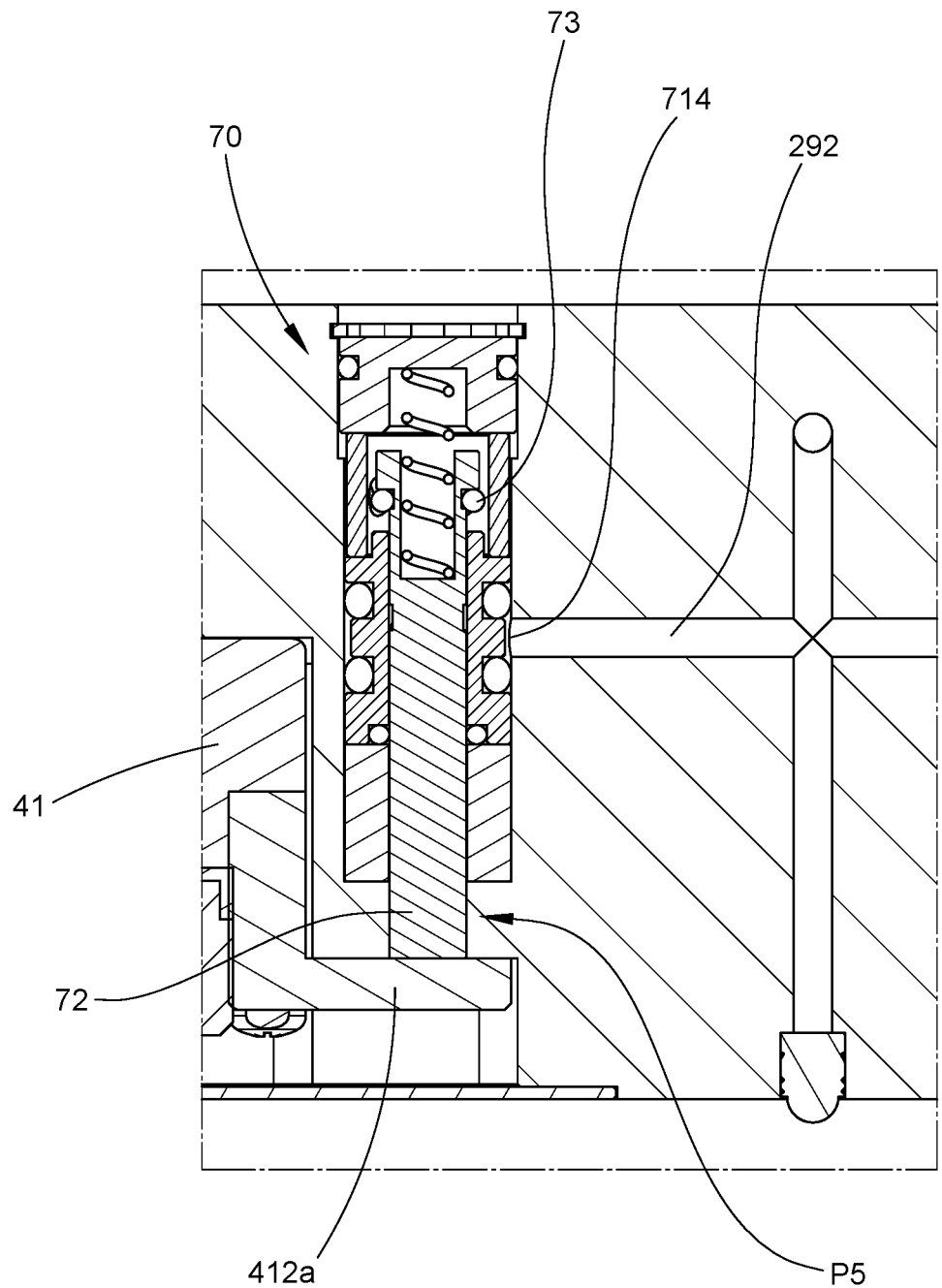
FIG. 21 is similar to FIG. 10, showing that the second flow channel switch is located at the open position.
Figure 22:
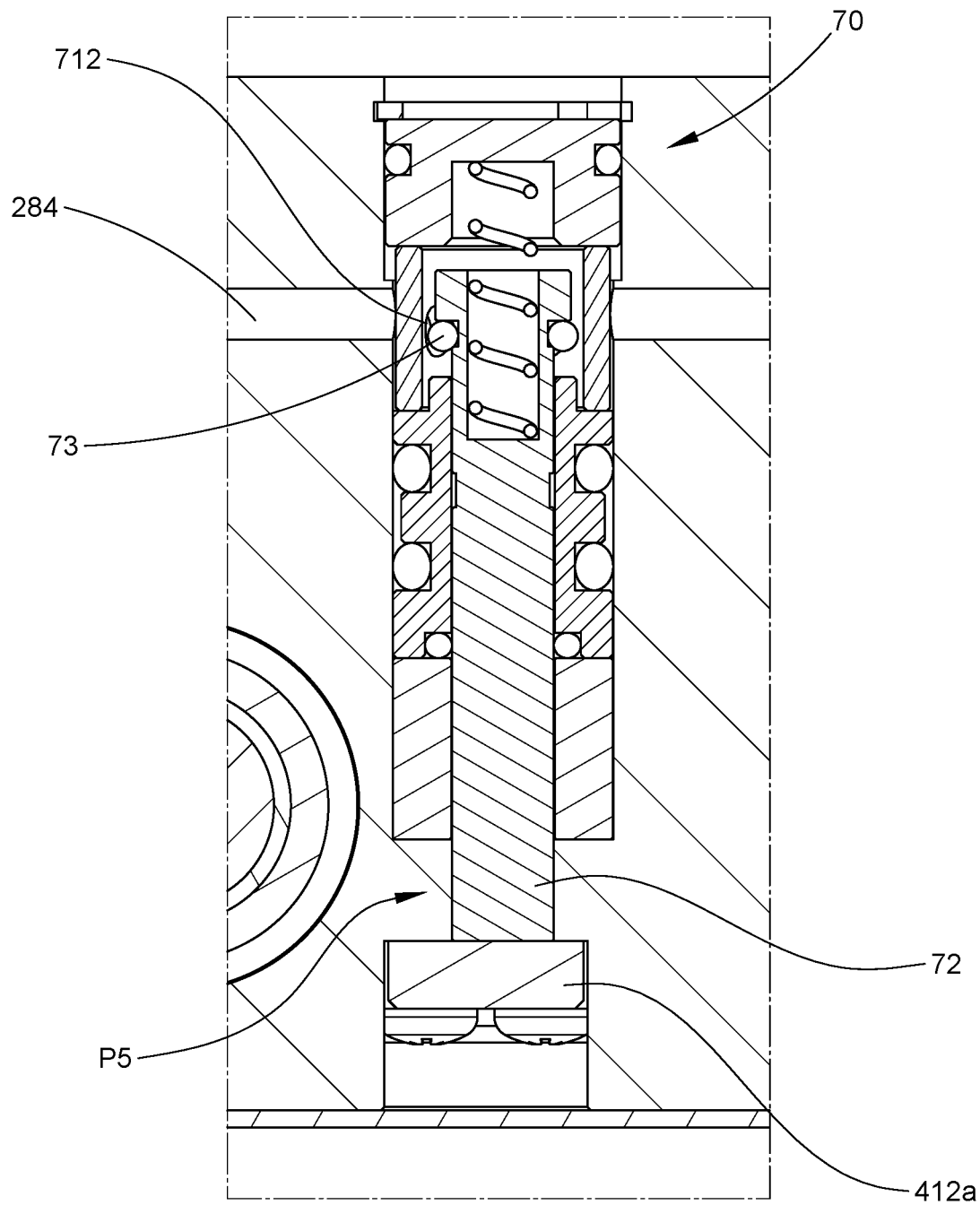
FIG. 22 is similar to FIG. 9, showing that the second flow channel switch is located at the open position.

As shown in FIG. 2, the second flow channel switch 70 is disposed in the junction of the sixth and seventh flow channels 28, 29. As shown in FIGS. 9 and 10, the second flow channel switch 70 includes a switch base 71, a stem 72, a sealing member 73, and an elastic member 74. The switch base 71 has a fluid input hole 712 connected with the sixth straight section 286 of the sixth flow channel 28, and a fluid output hole 714 connected with the seventh turning section 292 of the seventh flow channel 29. The stem 72 is disposed in the switch base 71 and has a head portion 722 and a body portion 724 connected with the head portion 722. The distal end of the body portion 724 is exposed outside the switch 71 so as to be pushed by the push portion 412a of the second piston shaft 41. The sealing member 73 is sleeved on the body portion 724 of the stem 72 and located between the fluid input hole 712 and the fluid output hole 714. The elastic member 74 has one end thereof abutted against the top portion of the switch base 71 and the other end thereof abutted against the head portion 722 of the stem 72 for providing an elastic force to the stem 72. In this way, when the stem 72 is located at a close position P4 by the elastic force of the elastic member 74, as shown in FIGS. 9 and 10, the fluid entering the switch base 71 through the fluid input hole 712 is not allowed to reach the fluid output hole 714 by obstruction of the sealing member 73, and when the stem 72 is pushed by the push portion 412a of the second piston shaft 41 to an open position P5, as shown in FIGS. 21 and 22, the fluid entering the switch base 71 through the fluid input hole 712 is allowed to reach the fluid output hole 714 without obstruction of the sealing member 73.

Figure 19:
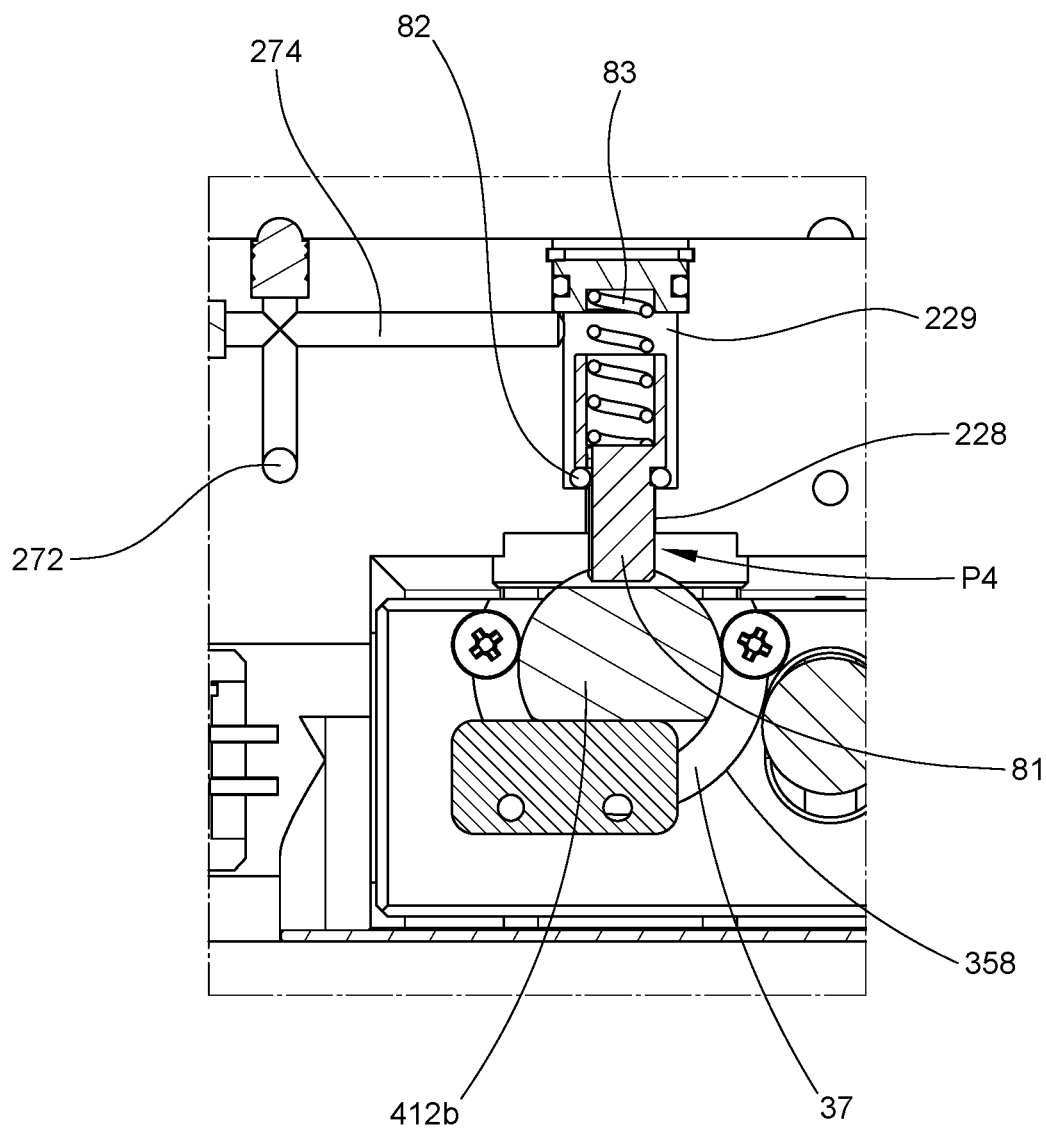
FIG. 19 is similar to FIG. 8, showing that the second flow channel switch is located at the close position.

As shown in FIG. 1, the third flow channel switch 80 is disposed in the junction of the fifth flow channel 27 and the fluid outlet 228. As shown in FIGS. 7 and 8, the third flow channel switch 80 includes a stem 81, a sealing member 82, and an elastic member 83. The stem 81 is disposed in the fluid output tank 229 and has a head portion 812 and a body portion 814 connected with the head portion 812. The distal end of the body portion 814 is exposed outside the receiving chamber 222 through the fluid outlet 228 so as to be pushed by the push portion 412b of the second piston shaft 41. The sealing member 82 is sleeved on the body portion 814 of the stem 81 and arranged adjacent to the fluid outlet 228. The elastic member 83 has one end thereof abutted against a tank cover 84 covering the fluid output tank 229 and the other end thereof abutted against the head portion 812 of the stem 81 for providing an elastic force to the stem 81. In this way, when the stem 81 is located at a close position P4 by the elastic force of the elastic member 83, as shown in FIGS. 18 and 19, the fluid entering the fluid output tank 229 through the fifth turning section 274 of the fifth flow channel 27 is not allowed to reach the fluid outlet 228 by the obstruction of the sealing member 82, and when the stem 81 is pushed by the push portion 412b of the second piston shaft 41 to an open position P5, as shown in FIGS. 7 and 8, the fluid entering the fluid output tank 229 through the fifth turning section 274 of the fifth flow channel 27 is allowed to reach the fluid outlet 228 without obstruction of the sealing member 82.

When the valve door 53 would like to be closed, as shown in FIG. 1, the fluid is provided into the first flow channel 23 through the first connector 12. A part of the fluid reaches the first flow channel switch 60 along the third flow channel 25 to wait for opening of the first flow channel switch 60. Another part of the fluid flows into the two first chambers 32 along the second straight sections 244 of the two second flow channels 24 (as shown in FIG. 5), such that the two first piston units 30 are pushed by the fluid entering the two first chambers 32 towards the valve port 212, as shown in FIG. 13. At this time, the first flow channel switch 60 is opened by one of the first piston shaft 34 to allow the fluid to flow through to the fourth flow channel 26 (as shown in FIG. 15) on one hand, and on the other hand, the two first piston shafts 34 drive the valve door 53 through the transmission base 35 and the driving shaft 52 to move from the first position P1 as shown in FIG. 12 to the second position P2 as shown in FIG. 13. Thereafter, a part of the fluid passing through the first flow channel switch 60 reaches the third flow channel switch 80 from the fourth flow channel 26 along the fifth turning section 274 of the fifth flow channel 27. Because the third flow channel switch 80 is located at the open position P5 as shown in FIG. 8 now, the fluid reaching the third flow channel switch 80 exits the valve base 20 through the fluid outlet 228 to complete depressurization. Another part of the fluid passing through the first flow channel switch 60 flows into the two third chambers 43 along the fourth turning section 264 of the fourth flow channel 26 (as shown in FIG. 7), such that the two second pistons 42 are pressed down simultaneously by the fluid entering the two third chambers 43. At this time, the two second piston units 40 drive the valve door 53 through the transmission base 35 and the driving shaft 52 to pivot from the second position P2 as shown in FIG. 16 to the third position P3 as shown in FIG. 17 to make the valve door 53 seal the valve port 212. However, During the movement of the two second piston units 40, the push portion 412b of the second piston shaft 41 releases the push force exerted on the stem 81 of the third flow channel switch 80, such that the stem 81 of the third flow channel switch 80 is closed by the elastic member 83 (as shown in FIGS. 18 and 19) to stop depressurization.

On the contrary, when the valve door 53 would like to be opened, as shown in FIG. 2, the fluid is provided into the sixth flow channel 28 through the second connector 14. A part of the fluid reaches the second flow channel switch 70 along the sixth straight section 286 of the sixth flow channel 28 to wait for opening of the second flow channel switch 70. Another part of the fluid flows into the two fourth chambers 44 along the two fifth straight sections 284 of the sixth flow channel 28, such that the two second pistons 42 are pushed up simultaneously by the fluid entering the two fourth chambers 44. At this time, the two second piston shafts 41 drive the transmission base 35 and the driving shaft 52 to move the valve door 53 from the third position P3 as shown in FIG. 17 to the second position P2 as shown in FIG. 16 to make the valve door 53 remove the seal of the valve port 212. During the movement of the two second piston units 40, the push portion 412b of the second piston shaft 41 applies a push force to the stem 81 of the third flow channel switch 80, such that the third flow channel switch 80 is back to the open position P5 as shown in FIG. 8, and the push portion 412a of the second piston shaft 41 applies a push force to the stem 72 of the second flow channel switch 70 to open the second flow channel switch 70 for passage of the fluid, as shown in FIGS. 21 and 22. Thereafter, the fluid passing through the second flow channel switch 70 reaches the two second chambers 33 (as shown in FIG. 13) along the two eighth straight sections 296 of the seventh flow channel 29, such that the first piston units 30 are pushed by the fluid entering the two second chambers 33 away from the valve port 212. During the movement of the first piston units 30 away from the valve port 212, the first piston shaft 34 abutted against the stem 62 of the first flow channel switch 60 releases the push force exerted on the stem 62 of the first flow channel switch 60, such that the first flow channel switch 60 is back to the close position P4 as shown in FIG. 6. At the same time, the two first piston shafts 34 drive the valve door 53 through the transmission base 35 and the driving shaft 52 to move from the second position P2 as shown in FIG. 16 to the first position P1 as shown in FIG. 12 to complete opening of the valve door 53. In addition, the fluid in the two first chambers 32 is pushed by the two first pistons 31 to flow into the first channel 23 along the second flow channel 24, as shown in FIG. 23, and then the fluid exits the valve base through the first connector 12 to complete depressurization.

Figure 23:
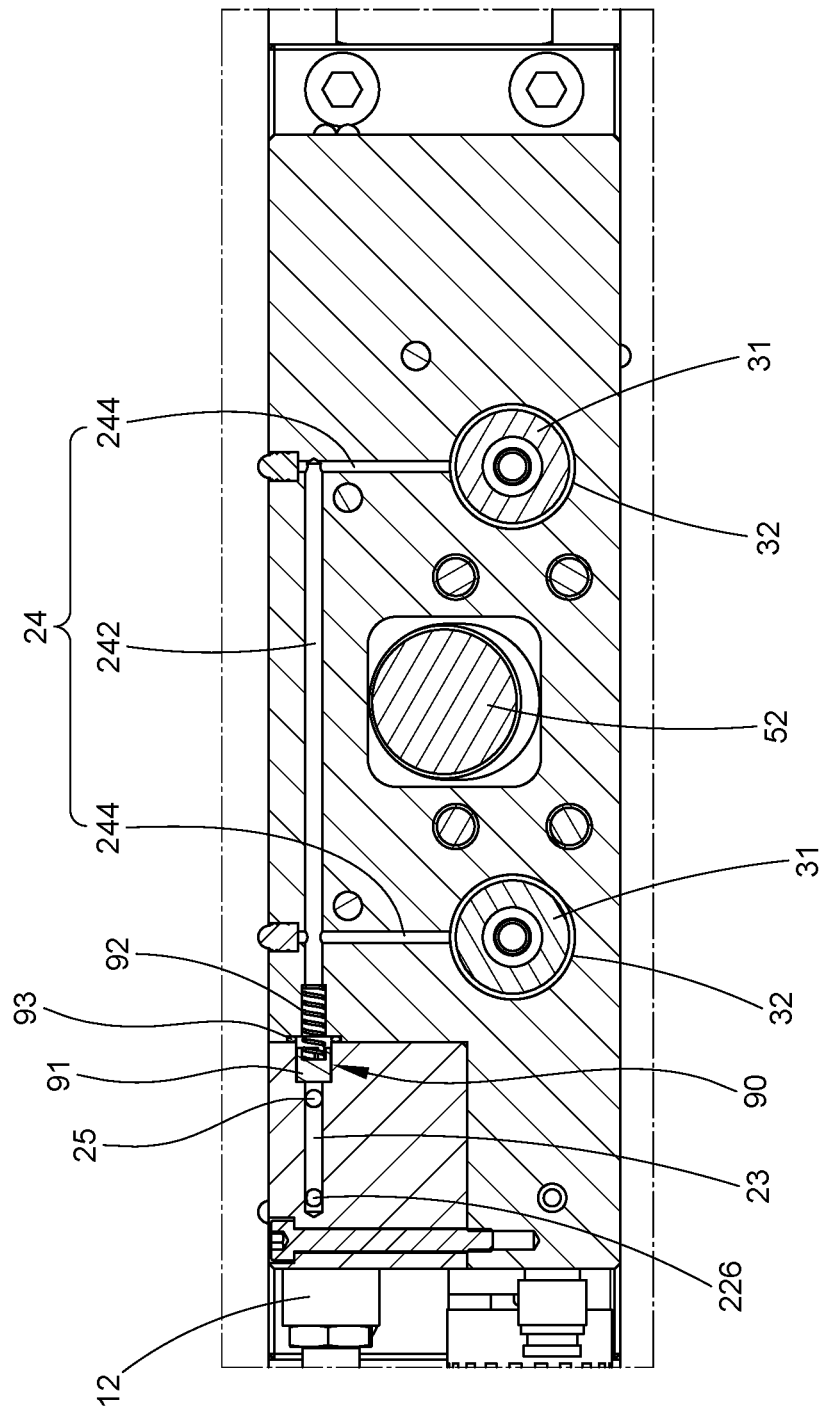
FIG. 23 is similar to FIG. 5, showing that the fluid flows to the first flow channel from the first chamber through the second flow channel.

What needs to be added here is that the valve base 20 further includes a buffer channel 90, as shown in FIGS. 5 and 23. The buffer channel 90 is connected between the first and second flow channels 23, 24 and has a diameter greater than the diameters of the first and second flow channels 23, 24. A plug 91 is disposed between the buffer channel 90 and the first flow channel 23, and the plug 91, the buffer channel 90 and the first flow channel 23 are not completely airtight. An elastic member 92 has one end thereof abutted against a junction of the buffer channel 90 and the first flow channel 24 and the other end thereof abutted against the plug 91 for providing an elastic force to push the plug 91 towards the first flow channel 23. In this way, when the pressure exerted by the fluid on the plug 91 is greater than the pressure exerted by the elastic member 92 on the plug 91, the fluid is allowed to flow from the first flow channel 23 to the second flow channel 24 through the buffer channel 90, and then reaches the first chambers 32 from the second flow channel 24. On the contrary, when the fluid reaches the buffer channel 90 from the first chambers 32 through the second flow channel 24, the fluid flows slowly into the first flow channel 23 along a gap between the plug 91 and the buffer channel 90, and then exits the valve base 20 from the first flow channel 23. As such, the discharge pressure of the fluid is buffered to prevent the valve door 53 from opening too fast.

As indicated above, the gate valve 10 of the present invention provides a plurality of flow channel switches 60, 70, 80 in different positions inside the valve base for controlling the flow of the fluid to make the pressure provided by the fluid actually drive the first piston units 30 and the second piston units 40, such that the valve door 53 can accurately close or open the valve port 212 to achieve purposes of enhancing accuracy in operation and ensuring airproof performance.

What is claimed is:

1. A gate valve comprising:
a valve base including a valve port, a shaft hole, a receiving chamber, a first piston trough, and a second piston trough, an axial direction of the shaft hole being vertical to an opening direction of the valve port, the receiving chamber being located between the valve port and the shaft hole, the first piston trough being arranged adjacent to the shaft hole and an axial direction of the first piston trough being vertical to the opening direction of the valve port, the second piston trough being arranged adjacent to the receiving chamber and an axial direction of the second piston trough being vertical to the opening direction of the valve port, the valve base further including a fluid gateway, a fluid inlet, a fluid outlet, a first flow channel communicating with the fluid gateway, a second flow channel communicating with the first flow channel, a third flow channel communicating with the first flow channel, a fourth flow channel communicating with the third flow channel, a fifth flow channel communicating with the fourth flow channel and the fluid outlet, a sixth flow channel communicating with the fluid inlet, and a seventh flow channel communicating with the sixth flow channel, wherein each of the first flow channel, the second flow channel, the third flow channel, the fourth flow channel, the fifth flow channel, the sixth flow channel, and the seventh flow channel is configured for passage of a fluid;
a first piston unit including a first piston, a first piston shaft, and a transmission base, the first piston being movably disposed in the first piston trough of the valve base, one end of the first piston and one end wall of the first piston trough forming a first chamber communicating the second flow channel, such that the first piston is driven by the fluid entering the first chamber to move towards the valve port along the axial direction of the first piston trough, an outer surface of the first piston and a periphery wall of the first piston trough forming a second chamber communicating with the seventh flow channel, such that the first piston is driven by the fluid entering the second chamber to move away from the valve port along the axial direction of the first piston trough, the first piston shaft being partially exposed outside the receiving chamber and having one end thereof connected with the first piston, such that the first piston shaft is driven by the first piston to move reciprocatedly along the axial direction of the first piston trough, the transmission base being disposed in the receiving chamber of the valve base in a way that the transmission base is movable along the axial direction of the first piston trough and connected with the first piston shaft in a way that the transmission base is movable along the axial direction of the second piston trough, such that the transmission base is driven by the first piston shaft to move reciprocatedly along the axial direction of the first piston trough;
a second piston unit including a second piston shaft and a second piston, the second piston shaft being inserted into the transmission base and allowing the transmission base to move along the axial direction of the first piston trough, the second piston being movably disposed in the second piston trough of the valve base and connected with the second piston trough, two end surfaces of the second piston and two end walls of the second piston trough forming a third chamber communicating with the fourth flow channel and a fourth chamber communicating with the sixth flow channel, respectively, such that the second piston is driven by the fluid entering the third chamber to push the transmission base through the second piston shaft away from the first piston shaft along the axial direction of the second piston trough, and driven by the fluid entering the fourth chamber to push the transmission base through the second piston shaft towards the first piston shaft along the axial direction of the second piston trough;
a valve door unit including a pivot base, a driving shaft, and a valve door, the pivot base being movably disposed in the shaft hole of the valve base, the driving shaft being fixed to the transmission base and having one end thereof penetrating into the shaft hole of the valve base and pivoted to the pivot base, such that the driving shaft is moved synchronously with the transmission base, the valve door being connected with the driving shaft, such that the valve door is moved through an axial movement of the driving shaft between a first position where the valve port is opened and a second position where the valve port is covered, and moved through a pivot movement of the driving shaft between the second position and a third position where the valve port is sealed; and a flow channel switch disposed in at least one of a junction of the third and fourth flow channels and a junction of the sixth and seventh flow channels, and allowing the fluid to pass through when turned on.

2. The gate valve as claimed in claim 1, wherein the flow channel switch is disposed in the junction of the third and fourth flow channels.

3. The gate valve as claimed in claim 2, wherein the flow channel switch is a first flow channel switch, including a switch base having a fluid input hole connected with the third flow channel and a fluid output hole connected with the fourth flow channel, a stem disposed in the switch base and driven by the first piston shaft to move from a close position where the fluid entering the switch base through the fluid input hole is not allowed to reach the fluid output hole by obstruction of a sealing member sleeved on the stem to an open position where the fluid entering the switch base through the fluid input hole is allowed to reach the fluid output hole, and an elastic member providing an elastic force to the stem for keeping the stem in the close position.

4. The gate valve as claimed in claim 1, wherein the flow channel switch is disposed in the junction of the sixth and seventh flow channels.

5. The gate valve as claimed in claim 4, wherein the flow channel switch is a second flow channel switch, including a switch base having a fluid input hole connected with the sixth flow channel and a fluid output hole connected with the seventh flow channel, a stem disposed in the switch base and driven by the second piston shaft to move from a close position where the fluid entering the switch base through the fluid input hole is not allowed to reach the fluid output hole by obstruction of a sealing member sleeved on the stem to an open position where the fluid entering the switch base through the fluid input hole is allowed to reach the fluid output hole, and an elastic member providing an elastic force to the stem for keeping the stem in the close position.

6. The gate valve as claimed in claim 1, wherein the junction of the third and fourth flow channels is provided with one said flow channel switch, and the junction of the sixth and seventh flow channels is provided with one said flow channel switch.

7. The gate valve as claimed in claim 6, wherein the flow channel switch disposed in the junction of the third and fourth flow channels is a first flow channel switch, including a switch base having a fluid input hole connected with the third flow channel and a fluid output hole connected with the fourth flow channel, a stem disposed in the switch base and driven by the first piston shaft to move from a close position where the fluid entering the switch base through the fluid input hole is not allowed to reach the fluid output hole by obstruction of a sealing member sleeved on the stem to an open position where the fluid entering the switch base through the fluid input hole is allowed to reach the fluid output hole, and an elastic member providing an elastic force to the stem for keeping the stem in the close position; the flow channel switch disposed in the junction of the sixth and seventh flow channels is a second flow channel switch, including a switch base having a fluid input hole connected with the sixth flow channel and a fluid output hole connected with the seventh flow channel, a stem disposed in the switch base and driven by the second piston shaft to move from a close position where the fluid entering the switch base through the fluid input hole is not allowed to reach the fluid output hole by obstruction of a sealing member sleeved on the stem to an open position where the fluid entering the switch base through the fluid input hole is allowed to reach the fluid output hole, and an elastic member providing an elastic force to the stem for keeping the stem in the close position.

8. The gate valve as claimed in claim 1, wherein a third flow channel switch is disposed in a junction of the fifth flow channel and the fluid outlet.

9. The gate valve as claimed in claim 8, wherein the valve base further includes a fluid output tank communicating with the fifth flow channel and the fluid outlet; the third flow channel switch includes a stem disposed in the fluid output tank and driven by the second piston shaft to move from a close position where the fluid entering the fluid output tank through the fifth flow channel is not allowed to reach the fluid outlet by the obstruction of a sealing member sleeved on the stem to an open position where the fluid entering the fluid output tank through the fifth flow channel is allowed to reach the fluid outlet, and an elastic member providing an elastic force to the stem for keeping the stem in the close position.

10. The gate valve as claimed in claim 1, wherein the valve base further includes a buffer channel connected between the first and second flow channels; a plug is disposed between the buffer channel and the first flow channel; an elastic member provides an elastic force to push the plug towards the first flow channel.

\* \* \* \* \*